United States Patent
Boegli et al.

(10) Patent No.: US 12,479,184 B2
(45) Date of Patent: Nov. 25, 2025

(54) METHOD AND TOOL FOR EMBOSSING OF BIODEGRADABLE PAPER TO FABRICATE CIGARETTE FILTERS

(71) Applicant: Boegli-Gravures SA, Marin-Epagnier (CH)

(72) Inventors: Charles Boegli, Marin-Epagnier (CH); Gabriel Dumitru, Nussbaumen (CH); Luis Antonio Sanches, Ladera Ranch, CA (US); Tadas Lukas Lisauskas, Encinitas, CA (US); Paulius Jurgutis, Farmington, MI (US)

(73) Assignee: BOEGLI-GRAVURES SA, Marin-Epagnier (CH)

( * ) Notice: Subject to any disclaimer, the term of this patent is extended or adjusted under 35 U.S.C. 154(b) by 102 days.

(21) Appl. No.: 18/339,918

(22) Filed: Jun. 22, 2023

(65) Prior Publication Data

US 2024/0157666 A1 May 16, 2024

(30) Foreign Application Priority Data

Nov. 11, 2022 (EP) .................................. 22207022

(51) Int. Cl.
*B31F 1/07* (2006.01)
*A24D 3/02* (2006.01)

(52) U.S. Cl.
CPC .................. *B31F 1/07* (2013.01); *A24D 3/02* (2013.01); *B31F 2201/0733* (2013.01)

(58) Field of Classification Search
CPC ....... B31F 1/07; B31F 2201/0733; A24D 3/02
See application file for complete search history.

(56) References Cited

U.S. PATENT DOCUMENTS 3,238,852 A   3/1966  Schur et al.
3,538,335 A  11/1970  Tartanian
(Continued)

FOREIGN PATENT DOCUMENTS

AU    772613 B2    5/2004
CA   2382597 A1   11/2000
(Continued)

OTHER PUBLICATIONS

Swiss Quality Paper AG, "Paper for cigarette filters," site visited on Jun. 23, 2023, 11 pages, https://www.swissqualitypaper.com/unsere-produkte/papier-fuer-zigarettenfilter/.
(Continued)

*Primary Examiner* — Anna K Kinsaul
*Assistant Examiner* — Nicholas E Igbokwe
(74) *Attorney, Agent, or Firm* — NIXON & VANDERHYE

(57) ABSTRACT

A method for embossing a sheet of substrate, wherein the embossing is realized by providing means of at least a first embossing roller and a second embossing roller configured to emboss first structures and second structures, thereby embossing the sheet of substrate when this passes in a nip formed by the first and second embossing rollers, whereby the embossed sheet of substrate is configured to be used in a manufacturing of cigarette filters, and is further configured to be entirely biodegradable. The method comprises providing a sheet of substrate. The method further comprises any one of the embossing steps in a list comprising: embossing the sheet of substrate with first structures to form crimping lines; embossing the sheet of substrate with second structures to form chimney structures; embossing the sheet of substrate with a combination of first and second structures to form crimping lines and chimney structures respectively. The crimping lines have a first width at a surface level of the (Continued)

sheet of substrate, and a first height or depth measured from the surface level in a first range of 0.1 mm to 0.5 mm, thereby configured to be deformable when used in the manufacturing process of cigarette filters. the chimney structures comprise segments that have a second width at the surface level of the sheet of substrate, in a second range of 0.5 mm to 5.0 mm, and a second height or depth measured from the surface level in a third range of 0.1 mm to 1.5 mm, thereby configured to remain open when used in the manufacturing process of cigarette filters and influence a pressure drop of air in such cigarette filters. Further the sheet of substrate comprises fibers with a cut length in a fourth range of 0.5 mm to 6.0 mm, and with a diameter in a fifth range of 10 μm to 500 μm, the fibers being entirely biodegradable and randomly distributed to deliver an air permeability. The sheet of substrate's air permeability being configured with filtration capabilities of substances present in a cigarette smoke.

14 Claims, 21 Drawing Sheets

(56) References Cited

U.S. PATENT DOCUMENTS

| | | | |
|---|---|---|---|
| 4,289,725 A * | 9/1981 | Muller | A24D 3/0204 264/287 |
| 5,007,271 A | 4/1991 | Boegli | |
| 5,598,774 A | 2/1997 | Boegli | |
| 6,176,819 B1 | 1/2001 | Boegli et al. | |
| 6,665,998 B1 | 12/2003 | Boegli | |
| 6,715,411 B1 | 4/2004 | Boegli | |
| 7,036,347 B2 | 5/2006 | Boegli | |
| 7,147,453 B2 | 12/2006 | Boegli | |
| 7,229,681 B2 | 6/2007 | Boegli | |
| 8,038,922 B2 | 10/2011 | Boegli | |
| 8,430,663 B2 | 4/2013 | Boegli | |
| 8,495,900 B2 | 7/2013 | Boegli | |
| 8,932,044 B2 | 1/2015 | Boegli | |
| 9,140,834 B2 | 9/2015 | Boegli | |
| 9,156,107 B2 | 10/2015 | Boegli et al. | |
| 9,180,643 B2 | 11/2015 | Boegli | |
| 9,481,141 B2 | 11/2016 | Boegli | |
| 9,505,167 B2 | 11/2016 | Boegli | |
| 9,579,924 B2 | 2/2017 | Boegli | |
| 9,636,885 B2 | 5/2017 | Boegli et al. | |
| 9,809,927 B2 | 11/2017 | Boegli | |
| 9,939,725 B2 | 4/2018 | Boegli et al. | |
| 9,993,895 B2 | 6/2018 | Boegli et al. | |
| 10,076,135 B2 * | 9/2018 | Lisauskas | B01D 39/18 |
| 10,083,253 B2 | 9/2018 | Boegli et al. | |
| 10,183,318 B2 | 1/2019 | Boegli et al. | |
| 2005/0279147 A1 | 12/2005 | Boegli | |
| 2005/0280182 A1 | 12/2005 | Boegli | |
| 2010/0061619 A1 | 3/2010 | Boegli | |
| 2012/0018993 A1 | 1/2012 | Boegli et al. | |
| 2012/0292821 A1 * | 11/2012 | Boegli | B31F 1/07 264/293 |
| 2012/0305015 A1 | 12/2012 | Sebastian et al. | |
| 2012/0318286 A1 | 12/2012 | Lisauskas et al. | |
| 2014/0059977 A1 | 3/2014 | Boegli | |
| 2015/0059789 A1 * | 3/2015 | Mccormack | A24D 3/04 131/331 |
| 2015/0114585 A1 * | 4/2015 | Boegli | D21F 3/086 162/256 |
| 2015/0374030 A1 * | 12/2015 | Lisauskas | A24D 3/0229 162/146 |
| 2016/0075077 A1 | 3/2016 | Boegli et al. | |
| 2017/0066079 A1 | 3/2017 | Reisse et al. | |
| 2017/0282635 A1 | 10/2017 | Boegli et al. | |
| 2018/0220698 A1 | 8/2018 | Boegli et al. | |
| 2018/0370175 A1 | 12/2018 | Boegli et al. | |
| 2020/0086600 A1 | 3/2020 | Boegli et al. | |
| 2020/0324505 A1 | 10/2020 | Boegli et al. | |
| 2021/0129478 A1 * | 5/2021 | Boegli | H04L 67/12 |
| 2021/0154964 A1 | 5/2021 | Boegli et al. | |
| 2021/0195939 A1 | 7/2021 | Volgger et al. | |
| 2021/0237199 A1 | 8/2021 | Boegli et al. | |
| 2021/0260633 A1 | 8/2021 | Boegli et al. | |
| 2021/0276298 A1 * | 9/2021 | Boegli | B31B 50/62 |
| 2022/0347962 A1 | 11/2022 | Boegli et al. | |
| 2023/0249430 A1 | 8/2023 | Boegli et al. | |

FOREIGN PATENT DOCUMENTS

| | | |
|---|---|---|
| CA | 2367423 C | 5/2008 |
| CN | 107997231 A | 5/2018 |
| CN | 108201169 A | 6/2018 |
| CN | 115053985 A1 | 9/2022 |
| DE | 202017105458 U1 | 10/2017 |
| EP | 1917870 B1 | 1/2011 |
| EP | 2327502 A1 | 6/2011 |
| EP | 2327503 A1 | 6/2011 |
| EP | 2572820 A1 | 3/2013 |
| EP | 2653301 A1 | 10/2013 |
| EP | 3300612 A1 | 4/2018 |
| EP | 3415306 A1 | 12/2018 |
| EP | 3700366 B1 | 4/2022 |
| EP | 4238891 A1 | 9/2023 |
| FR | 2418628 A1 | 9/1979 |
| GB | 1275405 A | 5/1972 |
| WO | 2007012215 A1 | 2/2007 |
| WO | 2014125096 A1 | 8/2014 |
| WO | 2022049510 A1 | 3/2022 |
| WO | 2022049511 A3 | 4/2022 |
| WO | 2022243917 A1 | 11/2022 |
| WO | 2023017302 A1 | 2/2023 |
| WO | 2023079418 A1 | 5/2023 |
| WO | 2023119169 A1 | 6/2023 |
| WO | 2024235695 A1 | 11/2024 |

OTHER PUBLICATIONS

McAirlaid's, "Genia the Next Generation Filter," site visited on Jun. 23, 2023, 3 pages, https://www.mcairlaids.net/us/products/cigarettefiltration/zigarettenfilter.html.

Extended European Search Report issued in European Patent Application No. 22207022.9 dated May 15, 2023.

* cited by examiner

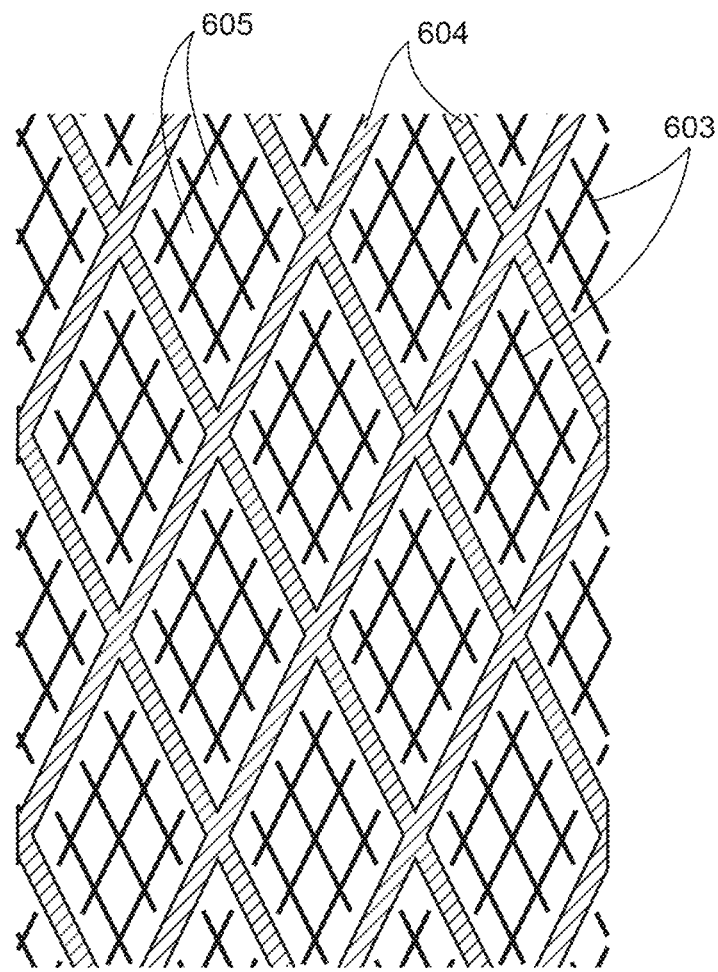
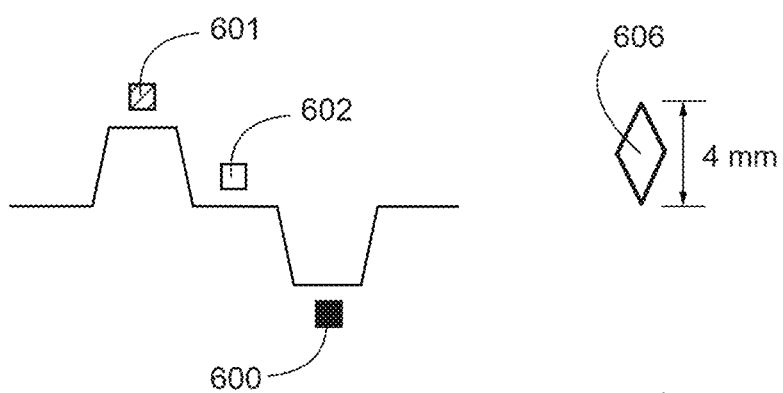
FIG. 6A

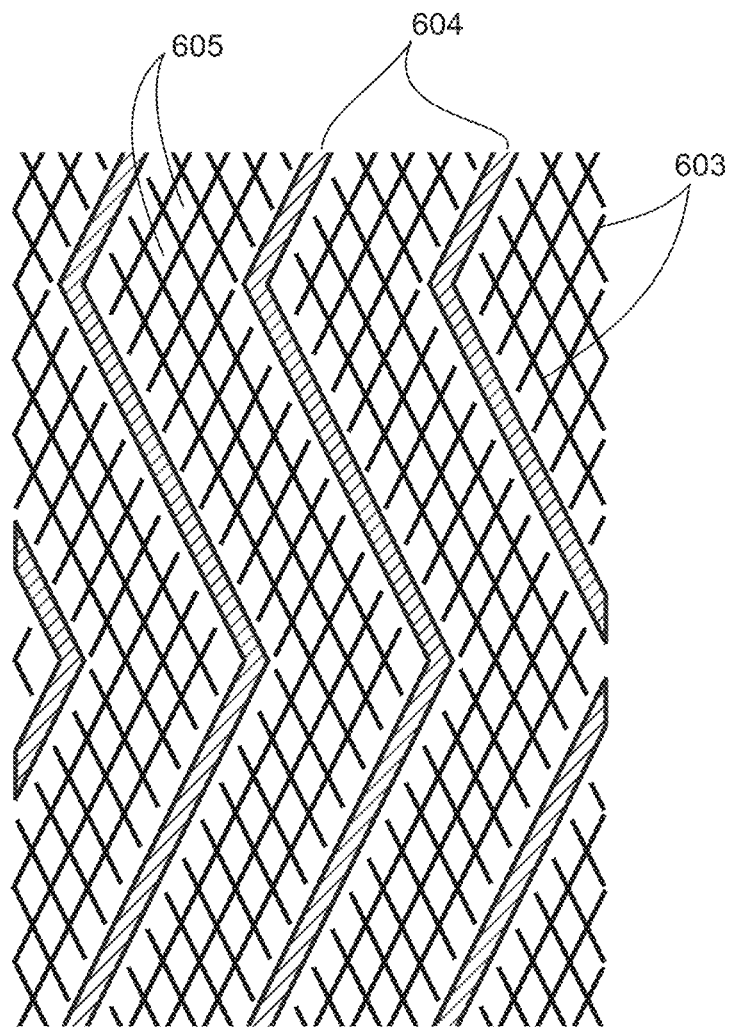
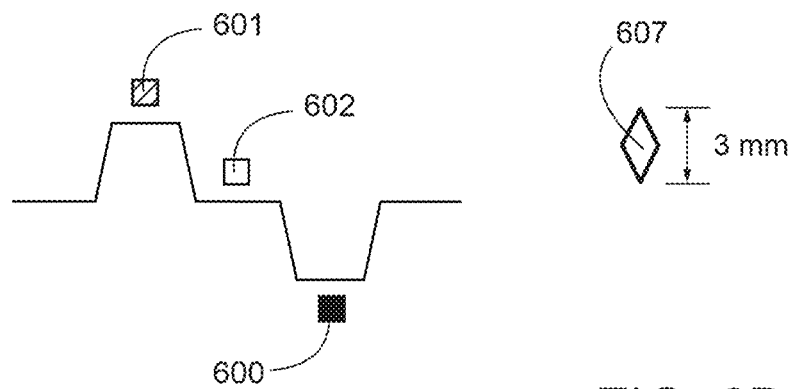
FIG. 6B

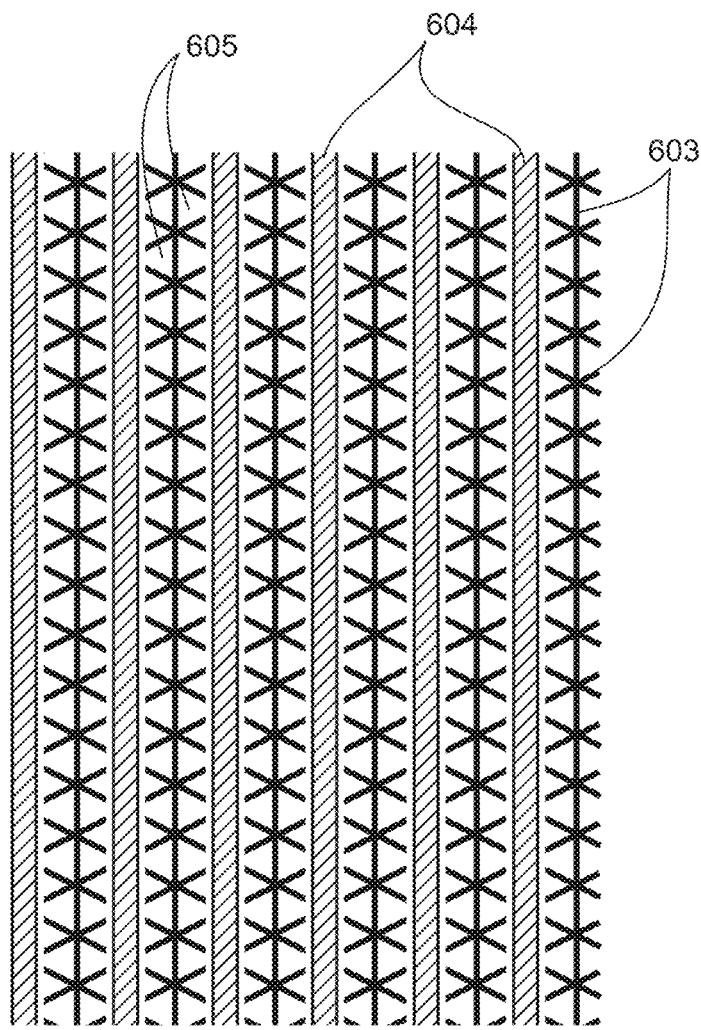
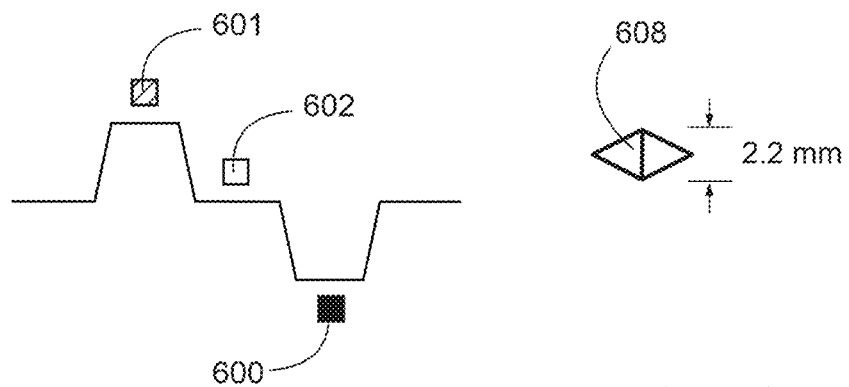
FIG. 6C

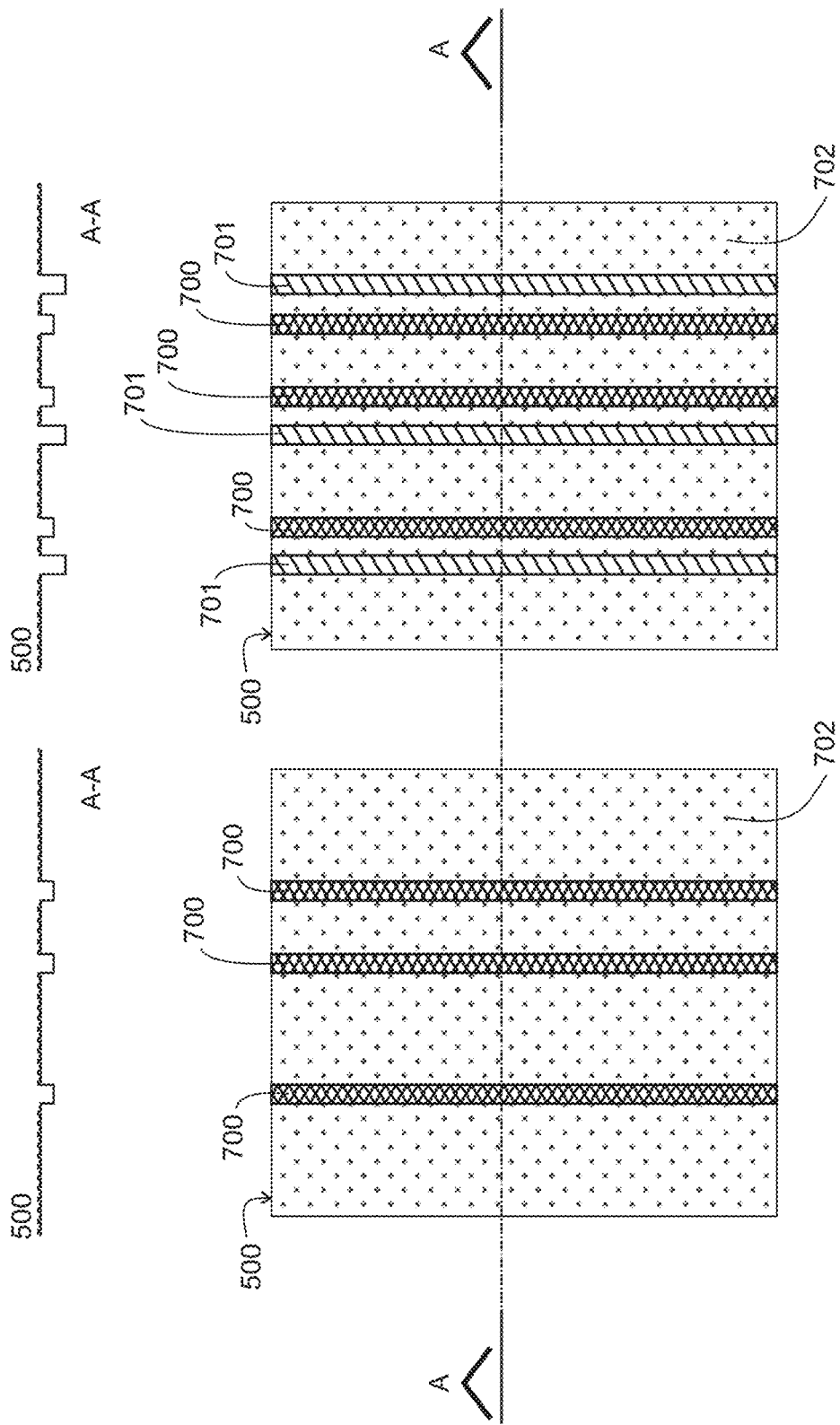

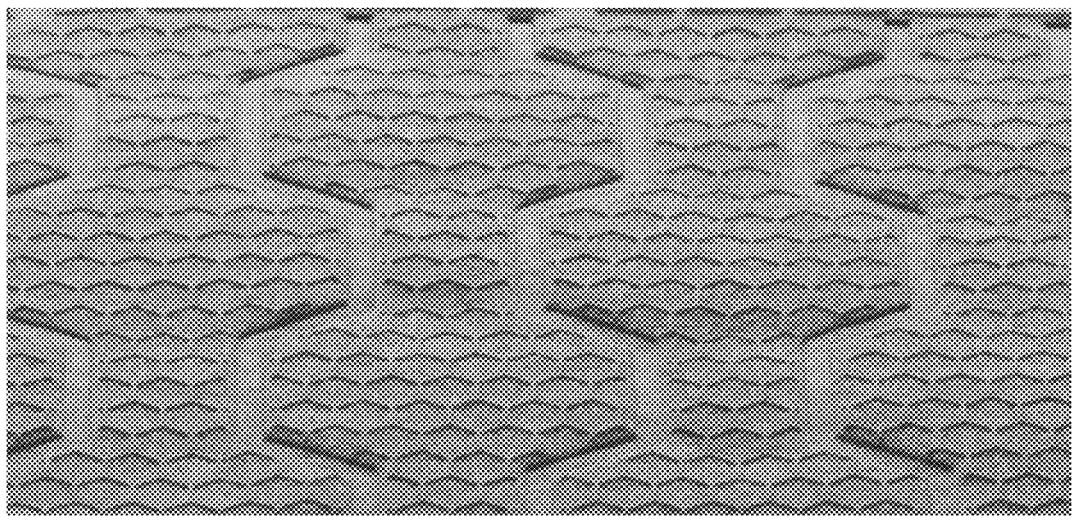
Recto
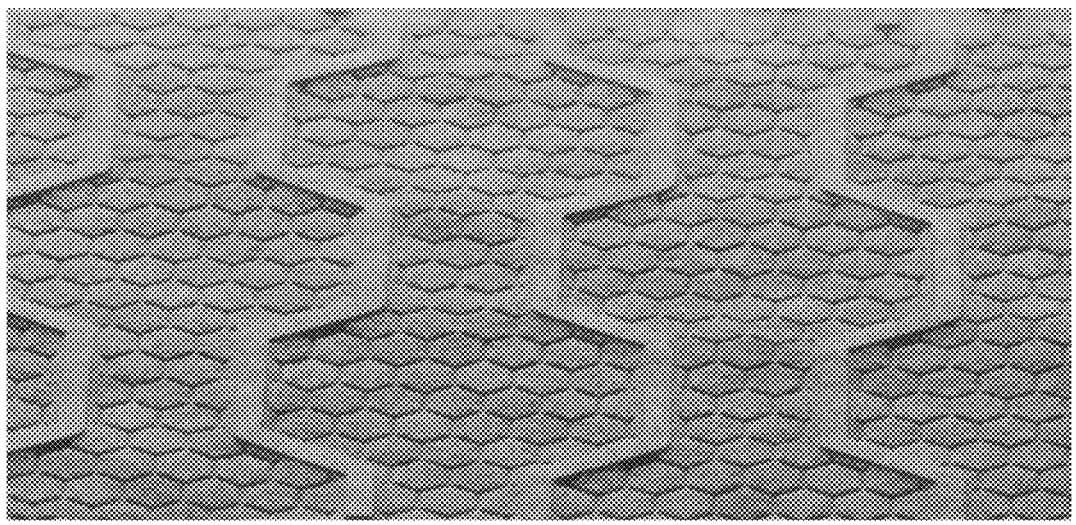
Verso
FIG. 8A

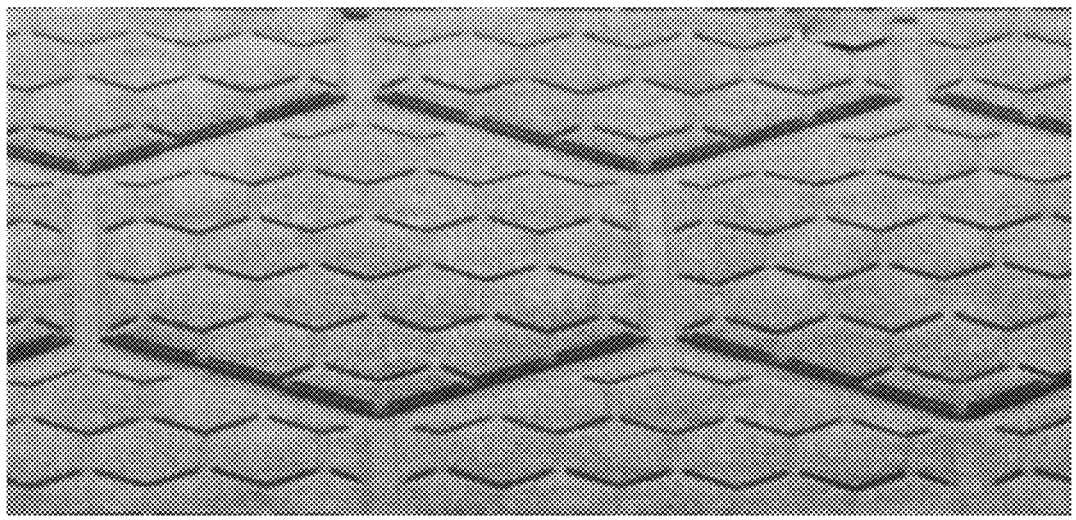
Recto
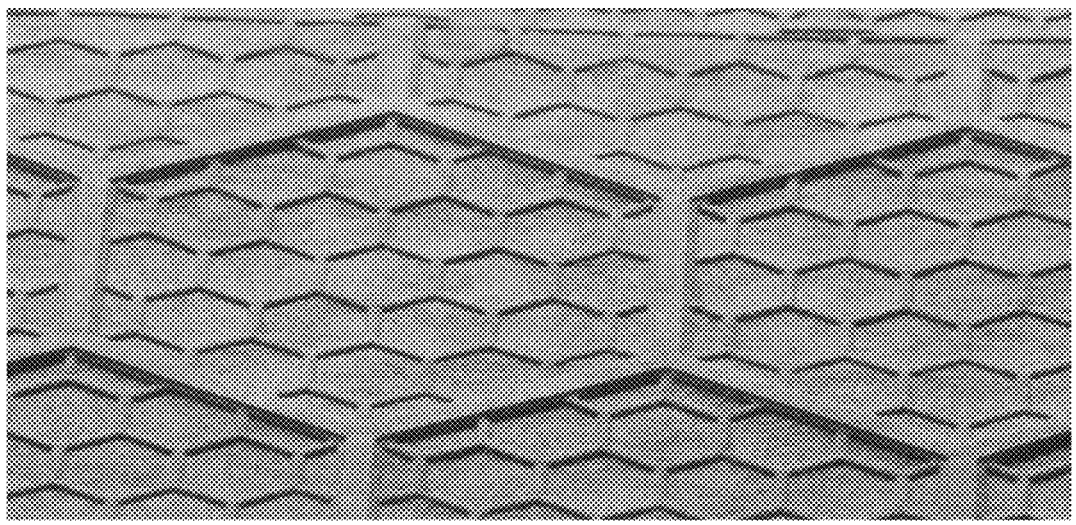
Verso
FIG. 8B

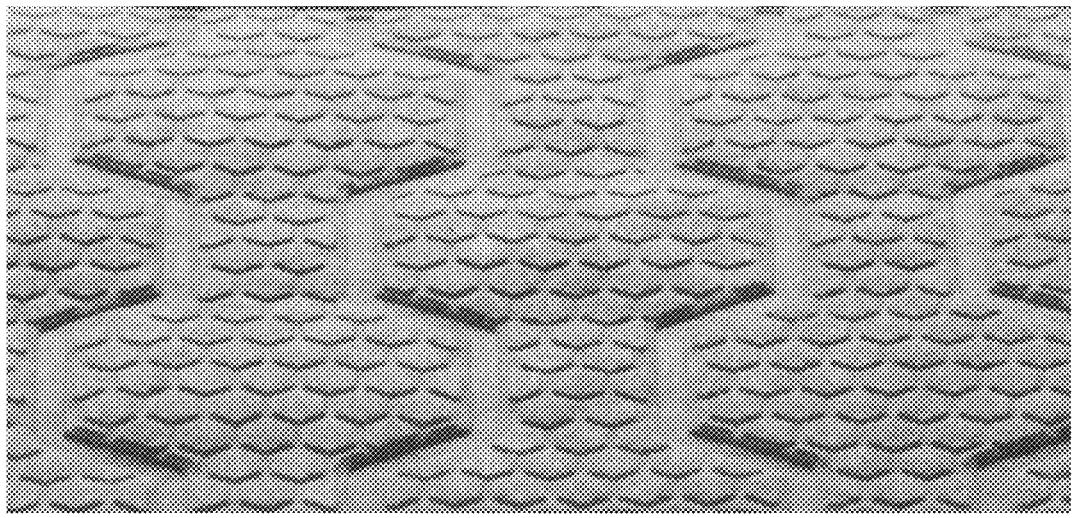
Recto
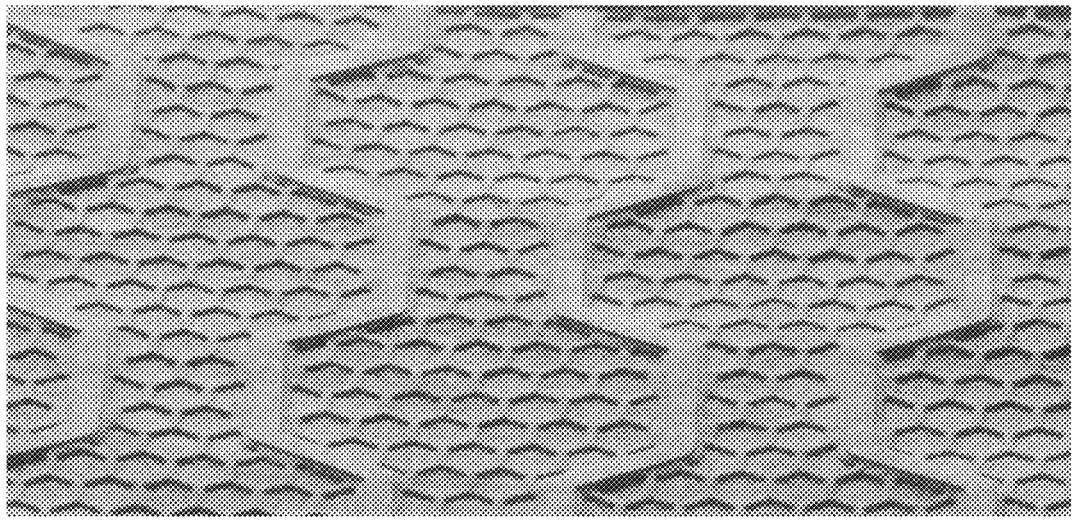
Verso
FIG. 8C

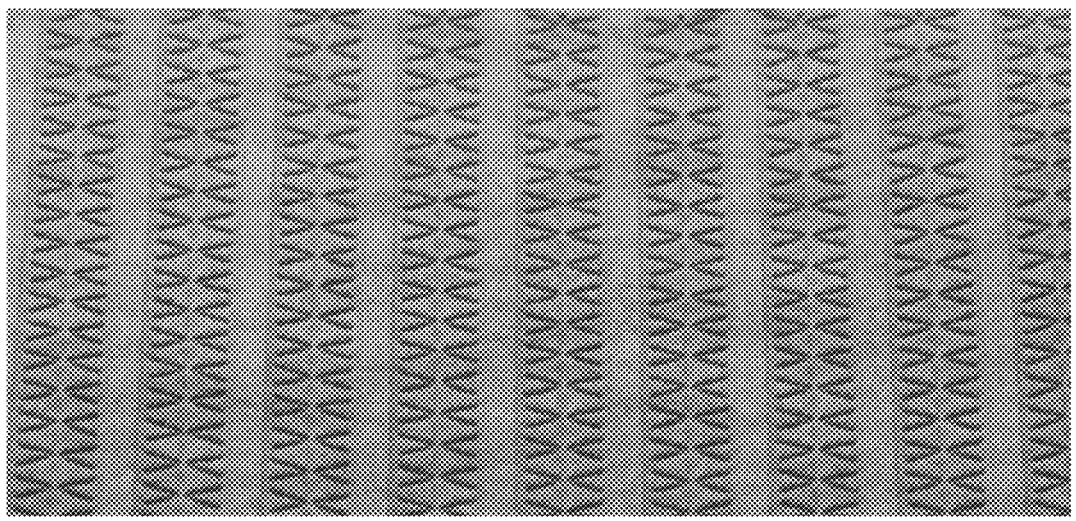
Recto
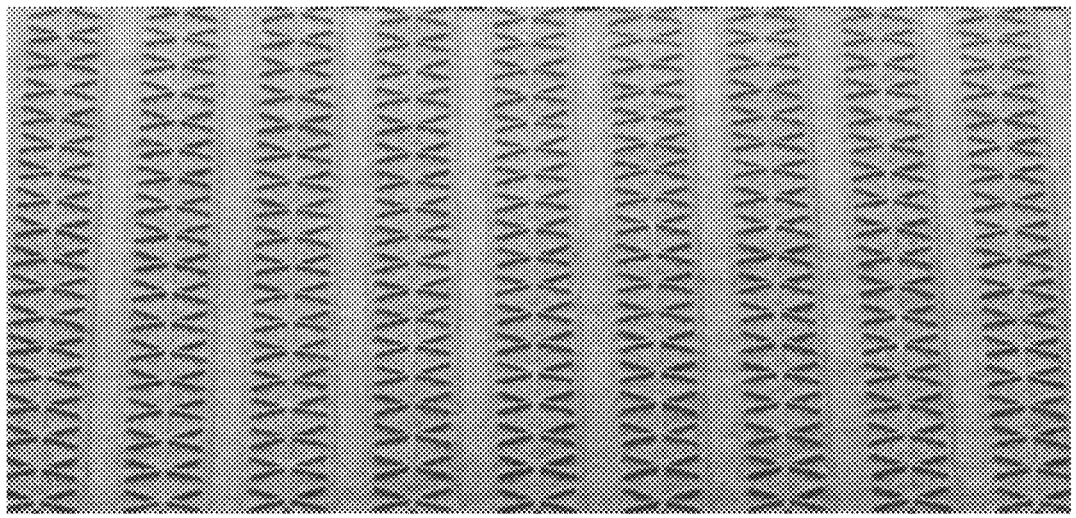
Verso
FIG. 8D

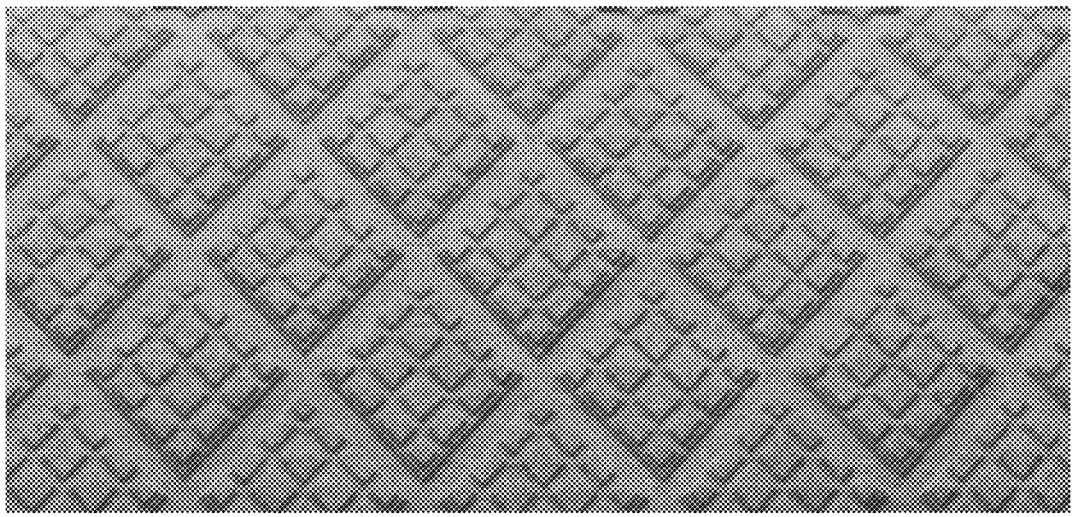
Recto
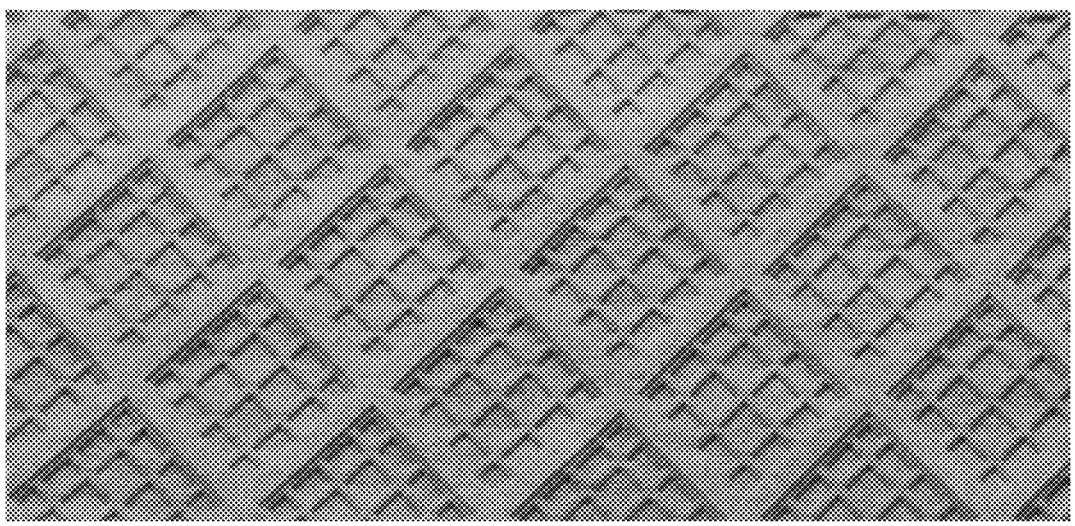
Verso
FIG. 8E

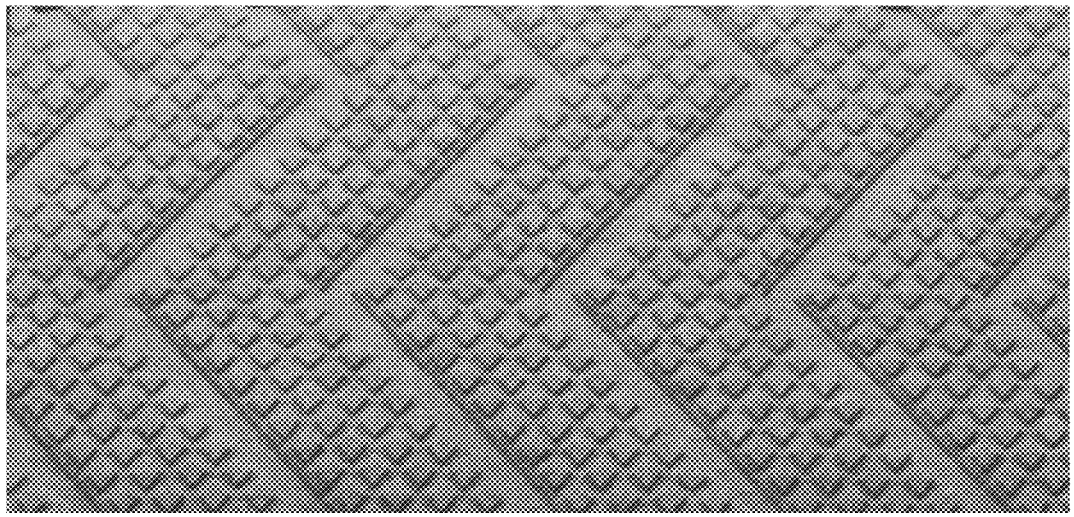
Recto
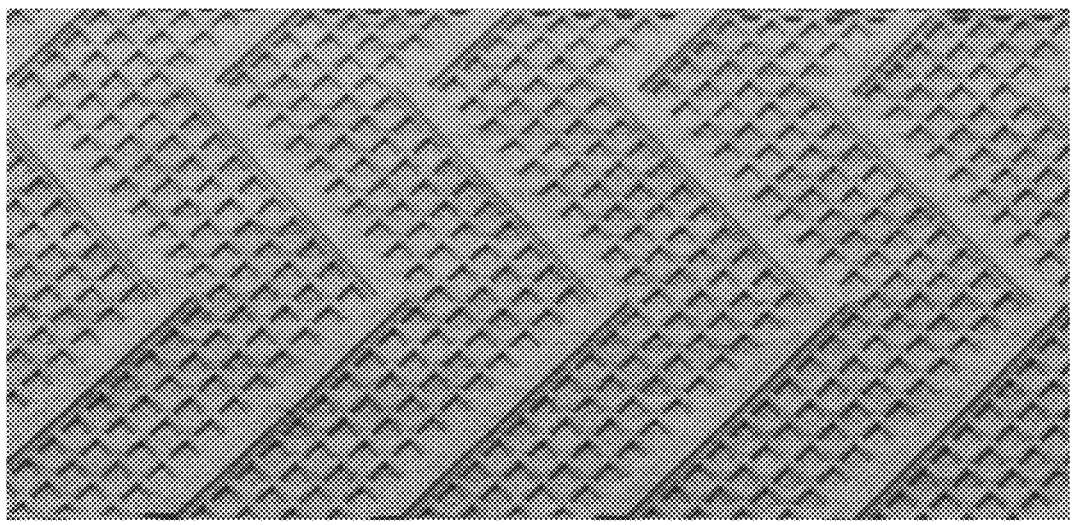
Verso
FIG. 8F

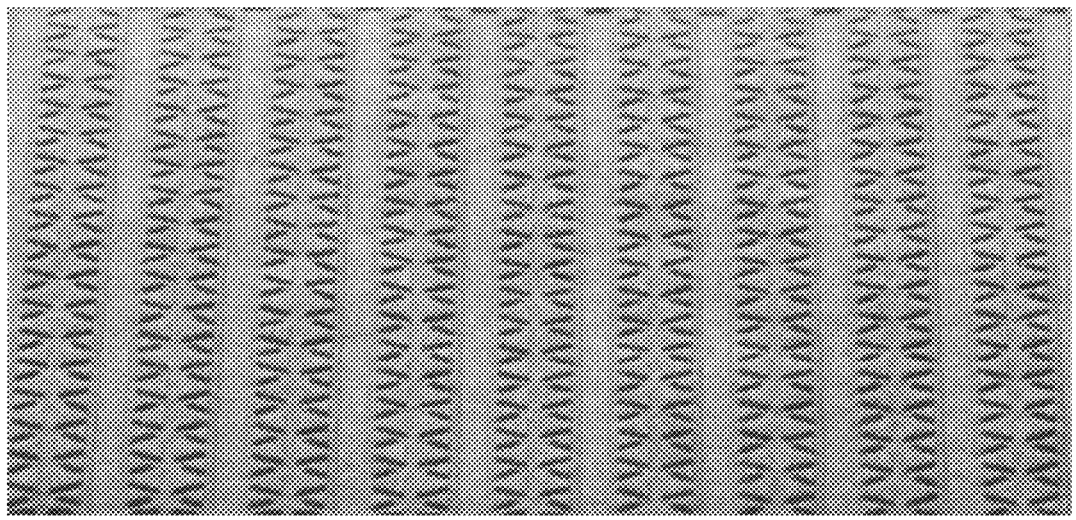
Recto
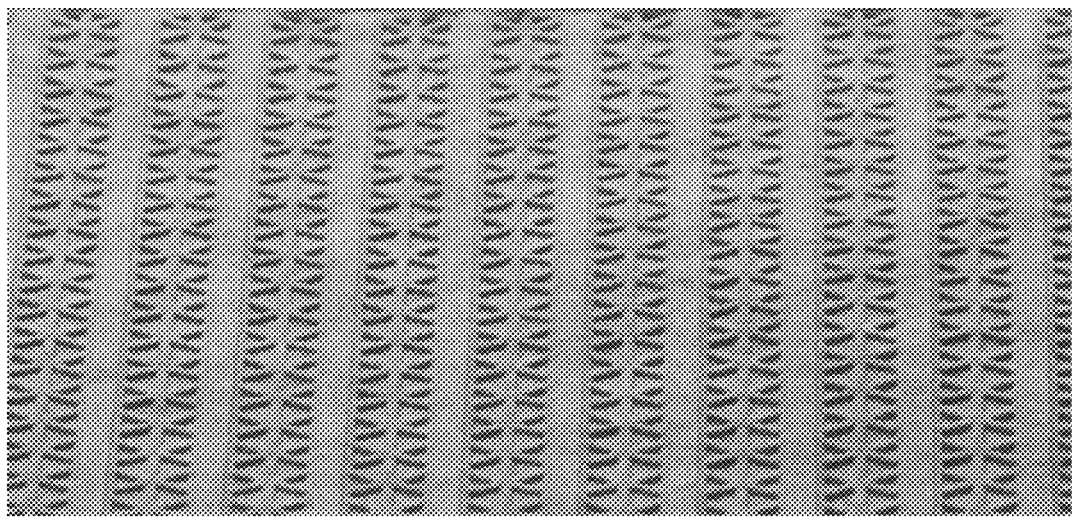
Verso
FIG. 8G

METHOD AND TOOL FOR EMBOSSING OF BIODEGRADABLE PAPER TO FABRICATE CIGARETTE FILTERS

CROSS-REFERENCE TO RELATED APPLICATIONS

This application claims priority to EP patent application Ser. No. 22/207,022.9 filed Nov. 11, 2022, the entire contents of which is hereby incorporated by reference.

TECHNICAL FIELD

The invention is in the field of embossing a biodegradable substrate which may, after embossing, be used for a manufacturing a cigarette filter.

BACKGROUND

US publication U.S. Pat. No. 3,238,852 describes to provide cigarettes and other smoking devices with a filter for the tobacco smoke, and to manufacture such filters by passing a continuous web of crepe paper of other compressible material into a forming cone which laterally gathers and compresses the web into cylindrical form having draft passages therethrough. In order to improve the manufacturing of such filter rod from a web of fibrous material, it is further disclosed a procedure which consists in longitudinally advancing the web, successively embossing the web at each surface thereof during its advancement and subjecting said web to longitudinal grooving with simultaneous stretching between a plurality of areas spaced transversely across the web to form random elongated discontinuous rents therein, and thereafter converging the embossed and grooved web to form a rod-like bundle. In other words, the fiber in the material is loosened by embossing which forms discontinuous relatively closely spaced longitudinal rents therein throughout the length in order to produce a web most suitable for laterally gathering and compressing into cylindrical form. The embossing involves a first soft surface roller and a second hard surface roller that carries structures for embossing the grooves into the web that is inserted in a nip between the first and the second roller. It is understood that the embossing is not intended to produce any relief on the surface of the web, and it should not either cut through the fiber in the material since the fiber should stick out to improve the effect of filtering.

French publication FR 2 418 628 discusses a method and a device for transforming a fibrous sheet in order to manufacture a cigarette filter or simple filter. The publication describes how to make a certain topographical profile on the sheet to obtain a filtering structure, whereby the height of the profile may be varied during the process, to vary at the same time a transversal stretching of the sheet, et hence its texture's characteristics, to obtain on one hand an embossed texture or on the other hand a longitudinal creped texture, or any intermediate texture, whereby the characteristics may be varied without any discontinuity. Hence the draft of the resulting filter may be adjusted as needed by suitably adapting the texture.

Since the publications of above prior art document, popular smoking articles have undergone significant development with a recent increased awareness of limiting consumption of chemicals which can impede the emotional enjoyment of smoking cigarettes or other products. In addressing the desire for an enhanced smoking experience, much research and development has centered around the cigarette filter which currently primarily serves the purpose of filtering the smoke generated from burning tobacco. Typically, a filter has a filter tow made from plasticized cellulose acetate and can also include polyhydric alcohols, and the tow is wrapped with an inner and outer layer of cigarette paper. The inner layer is known as the plug wrap and the outer wrapping layer is known as the tipping paper. A cigarette is smoked by a consumer lighting one end and burning the tobacco rod end of the cigarette, opposite from the filter. The smoker then receives mainstream smoke into his mouth by drawing the tobacco smoke through the filter on the opposite end of the cigarette.

Certain cigarettes incorporate filter elements or tows having absorbent materials dispersed therein, such as activated carbon or charcoal materials in particulate or granular form. For example, a cigarette filter can possess multiple segments, and at least one of those segments can comprise particles of high carbon-content materials.

In other areas of the art, cellulose acetate is known and widely used in cigarette filter material. In most forms the biodegradability of cellulose acetate remains relatively low. Further, the biodegradation character of cellulose acetate is most often dependent on the degree of substitution, or the number of acetyl groups per glucose unit of the cellulose acetate molecular structure. For example, if the degree of substitution of cellulose acetate is decreased, the biodegradation rate of cellulose acetate is increased.

A typical cigarette includes the filter at one end. This has a core or body which filters the smoke generated from burning tobacco and a paper wrapper having one or more wrapper layers surrounding the filter body. The filter core or body is commonly made from a fibrous filter material and a binder. After a user smokes the cigarette, the filter or cigarette butt is typically discarded. Such filters are often discarded in outdoor areas such as beaches, parks, and the like. The materials making up the filter core and binder biodegrade only very slowly over lengthy periods of time and thus cause unsightly environmental litter and pollution.

Attempts have been made to address the problem of non-biodegradable materials in filter cigarettes. In some studies, investigators have sought to introduce micro-organisms which act to accelerate the degradation process. In such methods however, the biodegradation rate of the entire filter is determined by the biodegradation rate of the material that can be easily biodegraded and, thus, the biodegradation rate of the cellulose acetate itself is not increased.

Other proposals for biodegradable and partially biodegradable filters involve relatively complicated manufacturing processes which often require chemical intermediates for production. Moreover, such methods also do not address the issue of introduction of complex chemical compounds into the environment which leads to pollution.

US publication U.S. Pat. No. 10,076,135 B2 to Lisauskas et al. discloses a filter and methods for producing a more environmentally friendly cigarette filter to assist in decreasing pollution and litter from cigarette filters which currently employ use of chemicals and materials that are synthetic, non-biodegradable and harmful to smokers and the environment. The disclosed cigarette filter makes use of a tow that includes a mixture of at least two or more natural materials selected from the group consisting of hemp fiber, flax fiber, abaca fiber or pulp, sisal fiber or pulp, wood pulp, and cotton fiber or cotton flock. Hence the disclosed cigarette filter is made of all natural and compostable materials which are readily biodegradable when cigarette butts are discarded outdoors.

The website swissqualitypaper.com is dedicated to offering paper for various purposes, including paper for manufacturing cigarette filter. The so obtained cigarette filter is said to be 100% biodegradable thanks to natural, ecological raw materials and production processes. The paper sheets are offered in weights ranging between 30 to 90 g/m². Also the paper is said to have better filtration properties than acetate, but it isn't said how the better filtration properties are achieved.

The website McAirlaid's.net presents a filter material that consists of 100% cellulose, known as a sustainable raw material, and also for its property to reduce the absorption of phenol and tar. The filter so obtained is said to be fully compostable, to rot in a few weeks rather than in up to 15 years as is the case for conventional cigarette filters. However, the website fails to indicate how filtration is achieved and how the filtration and/or draft can be adjusted in a cigarette filter.

It is an object of the invention to provide an alternative environmentally friendly sheet of substrate that can be utilized to manufacture a cigarette filter, and methods for producing the same. It is a further object that the sheet of substrate may be transformed to improve a smoking performance, for example by enhancing or reducing filtration capability of the cigarette filter that is made with the sheet of substrate according to the invention.

SUMMARY OF THE INVENTION

The invention provides a method for embossing a sheet of substrate, wherein the embossing is realized by providing means of at least a first embossing roller and a second embossing roller configured to emboss first structures and second structures, thereby embossing the sheet of substrate when this passes in a nip formed by the first and second embossing rollers, whereby the embossed sheet of substrate is configured to be used in a manufacturing of cigarette filters, and is further configured to be entirely biodegradable. The method comprises providing the sheet of substrate. The method further comprises any one of the embossing steps in a list comprising:
 a. embossing the sheet of substrate with first structures to form crimping lines;
 b. embossing the sheet of substrate with second structures to form chimney structures;
 c. embossing the sheet of substrate with a combination of first and second structures to form crimping lines and chimney structures respectively;

The crimping lines have a first width at a surface level of the sheet of substrate, and a first height or depth measured from the surface level in a first range of 0.1 mm to 0.5 mm, thereby configured to be deformable when used in the manufacturing process of cigarette filters. the chimney structures comprise segments that have a second width at the surface level of the sheet of substrate, in a second range of 0.5 mm to 5.0 mm, and a second height or depth measured from the surface level in a third range of 0.1 mm to 1.5 mm, thereby configured to remain open when used in the manufacturing process of cigarette filters and influence a pressure drop of air in such cigarette filters. Further the sheet of substrate comprises fibers with a cut length in a fourth range of 0.5 mm to 6.0 mm, and with a diameter in a fifth range of 10 μm to 500 μm, the fibers being entirely biodegradable and randomly distributed to deliver an air permeability. The sheet of substrate's air permeability being configured with filtration capabilities of substances present in a cigarette smoke.

In a preferred embodiment, the method further comprises embossing the second structures in form of a plurality of chimney structures that cross each other at at least one intersection, whereby the at least one intersection is configured to enhance the random fiber distribution and therewith control an air flow and air turbulence therein, which produces a natural obstacle to the substances present in the cigarette smoke and to be trapped.

In a further preferred embodiment, the method further comprises embossing the sheet of substrate with third structures to form at least a stiffening groove configured to be transversal relative to an intended longitudinal shape of a cigarette filter to be manufactured with the embossed sheet of substrate, and confer a degree of stiffness to the cigarette filter, whereby the at least one stiffening groove has a third width at a surface level of the unaffected surface of the sheet of substrate, surface of crimping lines or surface of chimney structures traversed by the at least one stiffening groove, in a sixth range of 1.0 mm to 9.0 mm, and a third height or depth measured from the surface of the crimping lines, chimney structures and unaffected surface of the sheet of substrate, in a seventh range of 0.01 mm to 0.5 mm.

In a further preferred embodiment, the method for embossing a sheet of substrate is realized in an off-line process, thereby resulting in a bobbin of embossed sheet of substrate.

In a further preferred embodiment, the method further comprises at least one step of processing of the embossed sheet of substrate which is part of an online process configured for the manufacturing of cigarette filters.

In a further preferred embodiment, the at least one step of processing is any one of the list comprising compacting with a funnel the embossed sheet of substrate and form it into a filter rod; wrapping the filter rod with a cylindrical wrapper, dispensing a stripe of substrate sheet from a bobbin dispensing device configured to carry a bobbin and unroll it for any of the steps of embossing.

In a further preferred embodiment, the embossing of the first structures and the embossing of the second structures are configured to produce an uninterrupted and repeating pattern of crimping lines and chimney structures in a "wall-paper" fashion.

In a further preferred embodiment, the embossing of the first structures, the embossing of the second structures and the embossing of the third structures are configured to produce an uninterrupted and repeating pattern of crimping lines and chimney structures in a "wall-paper" fashion.

In a further preferred embodiment, the first structures and the second structures are arranged to form in the embossing pattern any one of polygonal, linear and elliptical shapes.

In a further preferred embodiment, the method further comprises embossing the sheet of substrate with any one of a logo, a QR-code forming structure, or a hidden information, the hidden information being configured to be readable by an image reading device that interprets the hidden information by means of decoding means.

In a further preferred embodiment, the embossing is realized in a patrix-matrix configuration.

In a further preferred embodiment, the sheet of substrate comprises a mixture of:
 20-60% by weight of abaca or sisal pulp or fiber or wood pulp, or 20-60% by weight of combinations of two or more of wood pulp, abaca pulp or fiber, and sisal pulp or fiber,
 5-25% by weight of hemp or flax short cut fibers or filler;
 10-35% by weight of cotton flock;
 5-40% by weight of regenerated cellulose fiber.

In a further preferred embodiment, the mixture also includes a natural binder or a binder manufactured from natural renewable sources.

In a further preferred embodiment, the sheet of substrate comprises a mixture of:
- 0-50% by weight of hemp fiber, hemp short cut fiber, or hemp filler;
- 0-50% by weight of flax fiber, flax short cut fiber, or flax filler;
- 0-95% by weight of abaca fiber or abaca pulp;
- 0-95% by weight of sisal fibers or sisal pulp;
- 0-50% by weight of wood pulp;
- 0-50% by weight of cotton fibers or cotton flock;
- 0-50% by weight of regenerated cellulose fibers; and
- 0-30% by weight of a natural binder or a binder manufactured from natural renewable sources.

BRIEF DESCRIPTION OF THE FIGURES

The invention will be better understood in the light of the detailed description of preferred embodiments and in reference to the figures, wherein

FIGS. 6A-6C show examples of embossing patterns embossed on a sheet of substrate for manufacturing a cigarette filter according to preferred embodiments of the invention;

FIGS. 7A and 7B show examples of embossing patterns to be embossed on a sheet of substrate for manufacturing a cigarette filter according to preferred embodiments of the invention;

FIGS. 8A to 8G are photographs showing front and back sides of embossed sheets of substrate according to examples of the invention;

Same references will be used to reference same or similar features throughout the figures.

DETAILED DESCRIPTION OF PREFERRED EMBODIMENTS OF THE INVENTION

Method for Embossing a Sheet of Substrate

In one aspect the invention is a method for embossing a sheet of substrate, whereby the embossed sheet of substrate is configured to be used in a manufacturing of cigarette filters and is further configured to be entirely biodegradable.

Accordingly, two types of embossing may be considered, i.e., for offline and online manufacturing, whereby the former denotes a standalone embossing method which results in the production of an embossed sheet of substrate, while the latter denotes an embossing method that is part of a manufacturing chain, in which a priori a sheet of substrate is input and a plurality of manufacturing steps are successively online executed to obtain cigarette filters at the output of the manufacturing chain.

Figure 1:
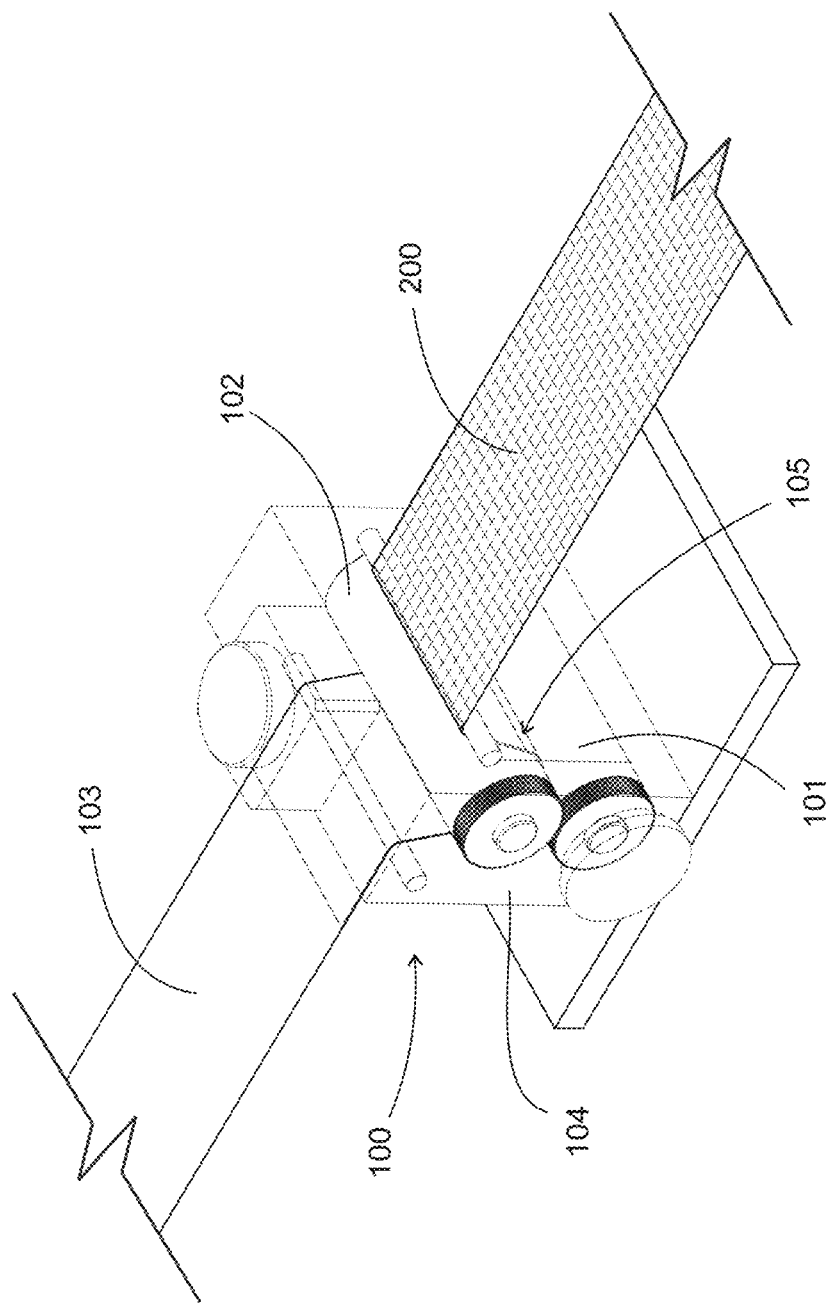
FIG. 1 shows an embossing system according to a preferred embodiment of the invention.

In one embodiment of the method for embossing, oriented to offline manufacturing of an embossed sheet of substrate, the method involves a step of providing the sheet of substrate. This may be achieved using an offline production stand for manufacturing the embossed sheet of substrate. Referring to FIG. 1 this illustrates an embossing system 100 comprising a first embossing roller 101 and a second embossing roller 102 that may be mounted in a quick exchange device 104, and are configured to cooperate with each other to emboss in a nip 105 a sheet of substrate 103 fed between the first embossing roller 101 and the second embossing roller 102.

The sheet of substrate 103 may for example be provided in form of a stripe.

As a result of the embossing, an embossed sheet of substrate 200 is obtained with a plurality of embossed structures (represented as a grid on the surface of the embossed sheet of substrate 200). The structures may be embossed according to any one of the following steps (steps not illustrated in FIG. 1):
- a. embossing the sheet of substrate 103 with first structures to form crimping lines;
- b. embossing the sheet of substrate 103 with second structures to form chimney structures;
- c. embossing the sheet of substrate 103 with a combination of first and second structures to form crimping lines and chimney structures respectively.

The crimping lines have a first width 521 at a surface level of the sheet of substrate 200, i.e., a level of the sheet of substrate not impacted from the embossing, and a first height 522 or depth measured from the surface level in a first range of 0.1 mm to 0.5 mm, thereby configured to be deformable when used in the manufacturing process of cigarette filters.

The chimney structures comprise segments that have a second width at the surface level of the sheet of substrate 200, in a second range of 0.5 mm to 3.0 mm, and a second height or depth measured from the surface level in a third range of 0.1 mm to 1.5 mm, thereby configured to remain open when used in the manufacturing process of cigarette filters and influence a pressure drop of air in such cigarette filters.

An optional bobbin dispensing device (not illustrated) may be configured to carry a bobbin with a stripe of sheet of substrate 103 and unwind it out towards the embossing system 100. A product bobbin device (not illustrated) may also optionally be provided to rewind the stripe of embossed sheet of substrate 200 for later use in the cigarette filter manufacturing.

Concerning the sheet of substrate 103, this preferably comprises fibers with a cut length in a fourth range of 0.5 mm to 6.0 mm, and with a diameter in a fifth range of 10 μm to 500 μm, the fibers being entirely biodegradable and randomly distributed to deliver an air permeability. The sheet of substrate's air permeability is configured with filtration capabilities of substances present in a cigarette smoke. More details about examples for the sheet of substrates' properties are indicated in a dedicated chapter herein below.

Figure 10:
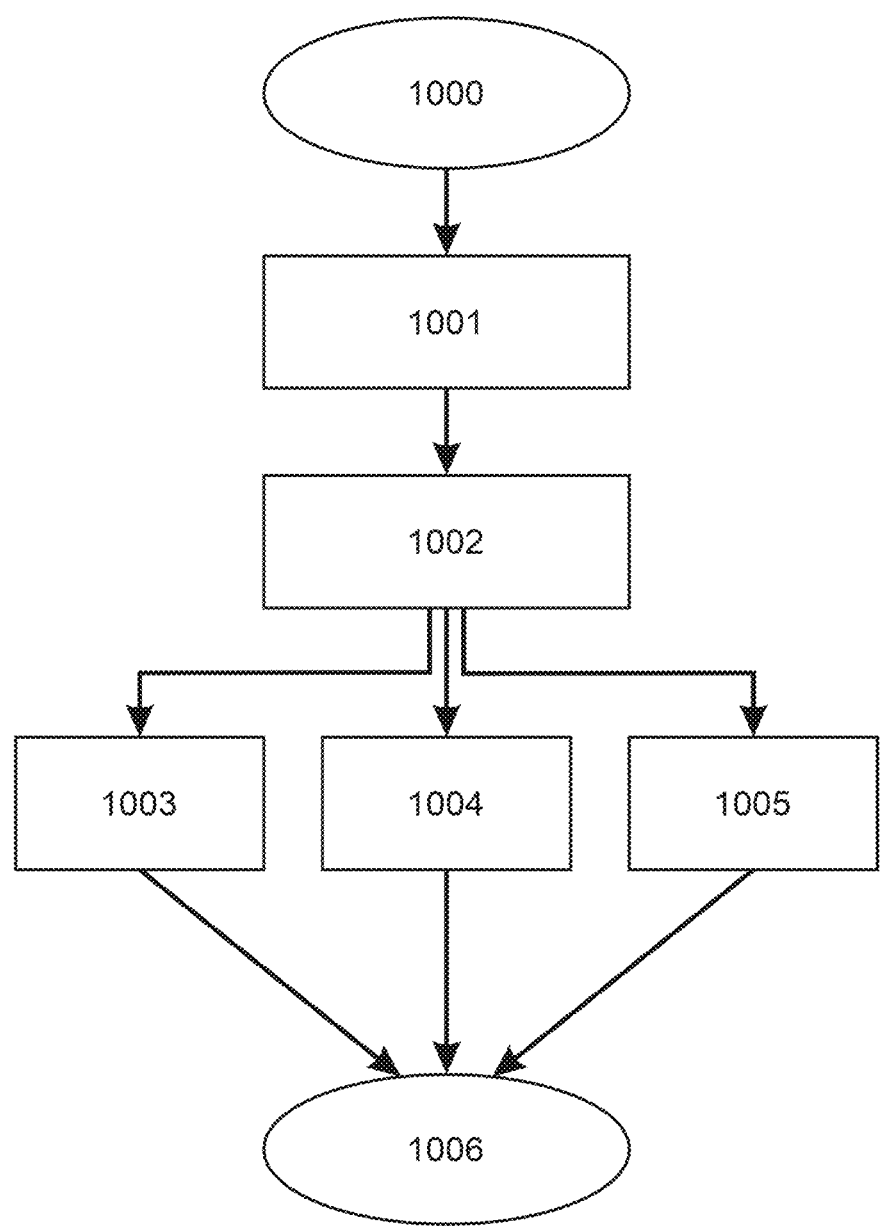
FIG. 10 contains a flowchart illustrating a method for embossing according to an example embodiment of the invention.

Referring to FIG. 10 this contains a flowchart illustrating an example method for embossing a sheet of substrate 1000 according to the invention. The method comprises a step

1001 of providing means of at least a first embossing roller and a second embossing roller configured to emboss first structures and second structures, thereby embossing the sheet of substrate when this passes in a nip formed by the first and second embossing rollers, whereby the embossed sheet of substrate 1006 is configured to be used in a manufacturing of cigarette filters, and is further configured to be entirely biodegradable. The method then comprises a step 1002 of providing the sheet of substrate 1000, and further any one of the embossing steps in a list comprising:
  a. embossing 1003 the sheet of substrate 1000 with first structures to form crimping lines;
  b. embossing 1004 the sheet of substrate 1000 with second structures to form chimney structures;
  c. embossing 1005 the sheet of substrate 1000 with a combination of first and second structures to form crimping lines and chimney structures respectively.

In the method, the crimping lines have a first width at a surface level of the sheet of substrate, and a first height or depth measured from the surface level in a first range of 0.1 mm to 0.5 mm, thereby configured to be deformable when used in the manufacturing process of cigarette filters; the chimney structures comprise segments that have a second width at the surface level of the sheet of substrate, in a second range of 0.5 mm to 5.0 mm, and a second height or depth measured from the surface level in a third range of 0.1 mm to 1.5 mm, thereby configured to remain open when used in the manufacturing process of cigarette filters and influence a pressure drop of air in such cigarette filters; the sheet of substrate 1000 comprises fibers with a cut length in a fourth range of 0.5 mm to 6.0 mm, and with a diameter in a fifth range of 10 µm to 500 µm, the fibers being entirely biodegradable and randomly distributed to deliver an air permeability; and the sheet of substrate's air permeability being configured with filtration capabilities of substances present in a cigarette smoke.

In the method for embossing, preferably the second structures are embossed in form of a plurality of chimney structures that cross each other at at least one intersection, whereby the at least one intersection is configured to enhance the random fiber distribution and therewith control an air flow and air turbulence therein, which produces a natural obstacle to the substances present in the cigarette smoke and to be trapped. This will become apparent in the examples of embossings illustrated herein below in a dedicated section. It may already be mentioned at this point that this further enhances the already present feature of random fiber distribution in the sheet of substrate by creating a more controlled air flow and consequently the air/fluid turbulence, particularly at intersection of chimney grooves, influencing the degree of filtration capability (air, fluid, smoke, etc.). The invention creates structured patterns and geometries focused on the influence on the air direction, reducing or accelerating air speed, and therefore boosting or decreasing air filtration capability. Air turbulence creates natural obstacles to "particulate molecules" to be trapped, i.e., the air flow remains in direct contact with the fibers of the sheet of substrate over a longer path.

The invention creates with the embossed structures a set of new layers of features and tools that allows a more effective way to control the aerodynamic capability of the substrate. As particles more through the substrate in a cigarette filter during smoking, the invention provides pathways that alters the direction and speed of air/fluid and consequently all the particles traveling through the air.

Although the invention does not alter thermodynamics of the material itself in the sheet of substrate, the air flow speed reduction will impact on the conversion of molecules travelling through the air altering the vapor/gas phase to particulate phase, altering the filtration capability.

In a preferred embodiment of the method according to the invention, this comprises embossing the sheet of substrate with third structures to form at least a stiffening groove configured to be transversal relative to an intended longitudinal shape of a cigarette filter to be manufactured with the embossed sheet of substrate and confer a degree of stiffness to the cigarette filter. The at least one stiffening groove has a third width at a surface level of the unaffected surface of the sheet of substrate, surface of crimping lines or surface of chimney structures traversed by the at least one stiffening groove, in a sixth range of 1.0 mm to 9.0 mm, and a third height or depth measured from the surface of the crimping lines, chimney structures and unaffected surface of the sheet of substrate, in a seventh range of 0.01 mm to 0.5 mm.

The at least one stiffening groove has a third width at a surface level of the unaffected surface of the sheet of substrate, surface of crimping lines or surface of chimney structures traversed by the at least one stiffening groove, in a sixth range of 1.0 mm to 9.0 mm, and a third height or depth measured from the surface of the crimping lines, chimney structures and unaffected surface of the sheet of substrate, in a seventh range of 0.01 mm to 0.5 mm.

In the overall, the invention provides an improvement on pressure drop and filter stiffness for a given amount of material (weight base material) as compared to a material not embossed according to the invention. Additional mechanical forces created by the inventive embossed pattern and geometry create axial strength that improves pressure drop and filter stiffness.

According to a preferred embodiment, the embossing of the first structures and the embossing of the second structures are configured to produce an uninterrupted and repeating pattern of crimping lines and chimney structures in a "wall-paper" fashion. This means among others that there is no determined point in the embossed sheet of substrate at which it is necessary to operate a cut to manufacture a cigarette filter, but rather the embossed sheet of substrate may be cut to need at any point. This is also the case when third structures for the stiffening grooves are embossed.

In a preferred embodiment, the method for embossing may further comprise a step of embossing the sheet of substrate with any one of a logo, a QR-code forming structure, or a hidden information, the hidden information being configured to be readable by an image reading device that interprets the hidden information by means of decoding means. This may be realized using the first embossing roller 101 and the second embossing roller 102.

Figure 3A:
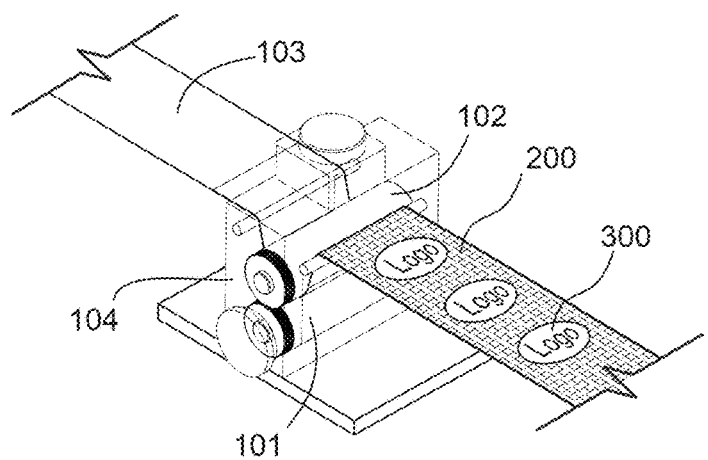
FIGS. 3A to 3C illustrate schematically the embossing of a logo, QR-forming code and hidden information over an embossed sheet of substrate according to example embodiments of the invention.

Referring to FIG. 3A this illustrates schematically the embossing of a logo 300 superposed on the embossed sheet of substrate 200. The logo 300 may typically be sized and configured such that the embossed product, i.e., the embossed logo, may be seen by a user's eyes (user not illustrated).

Figure 3B:
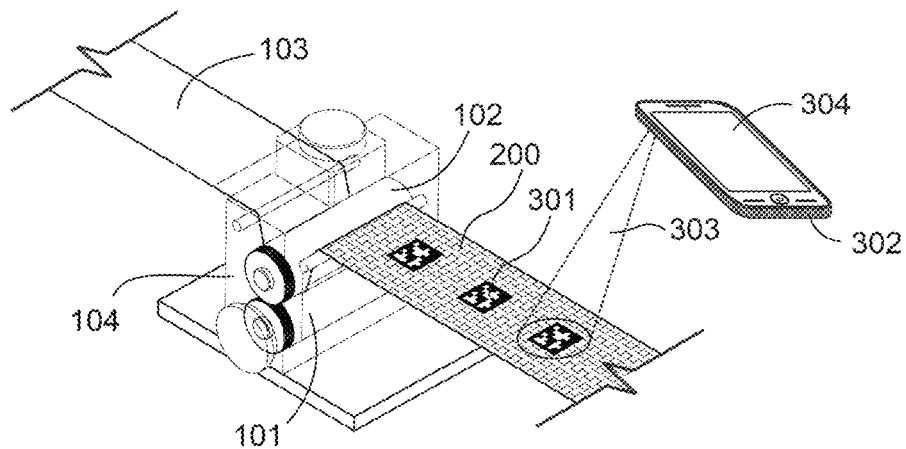

Referring to FIG. 3B this illustrates schematically the embossing of a QR-code forming structure 301 superposed on the embossed sheet of substrate 200. The QR-code forming structure 301 may typically be configured such that it is readable using an image reading device 302, e.g., a smartphone, that takes a picture 303 of the QR-forming structure 301 and interprets it to display a corresponding result on a display 304.

Figure 3C:
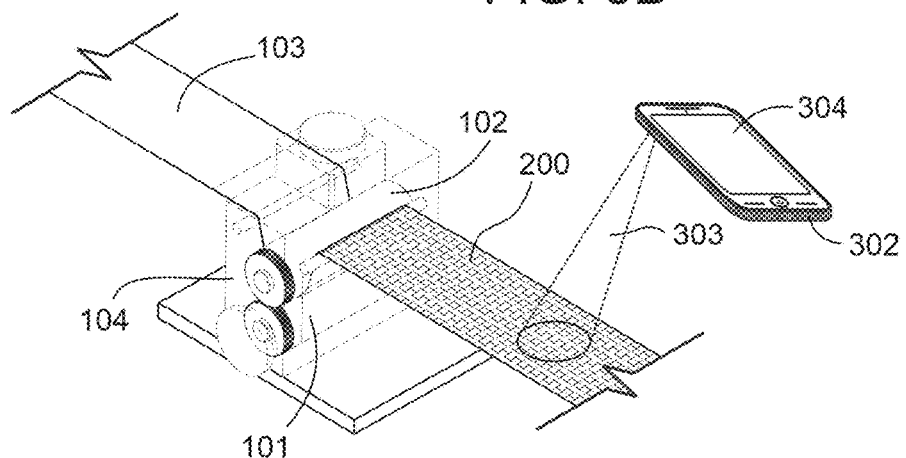

Referring to FIG. 3C this illustrates schematically the embossing of a hidden information (hidden information not illustrated in the figure) which micro-structures that can only be read out by making a picture 303 of the hidden information with the image reading device 302, which is then interpreted to display the corresponding result on the display 304.

Figure 2:
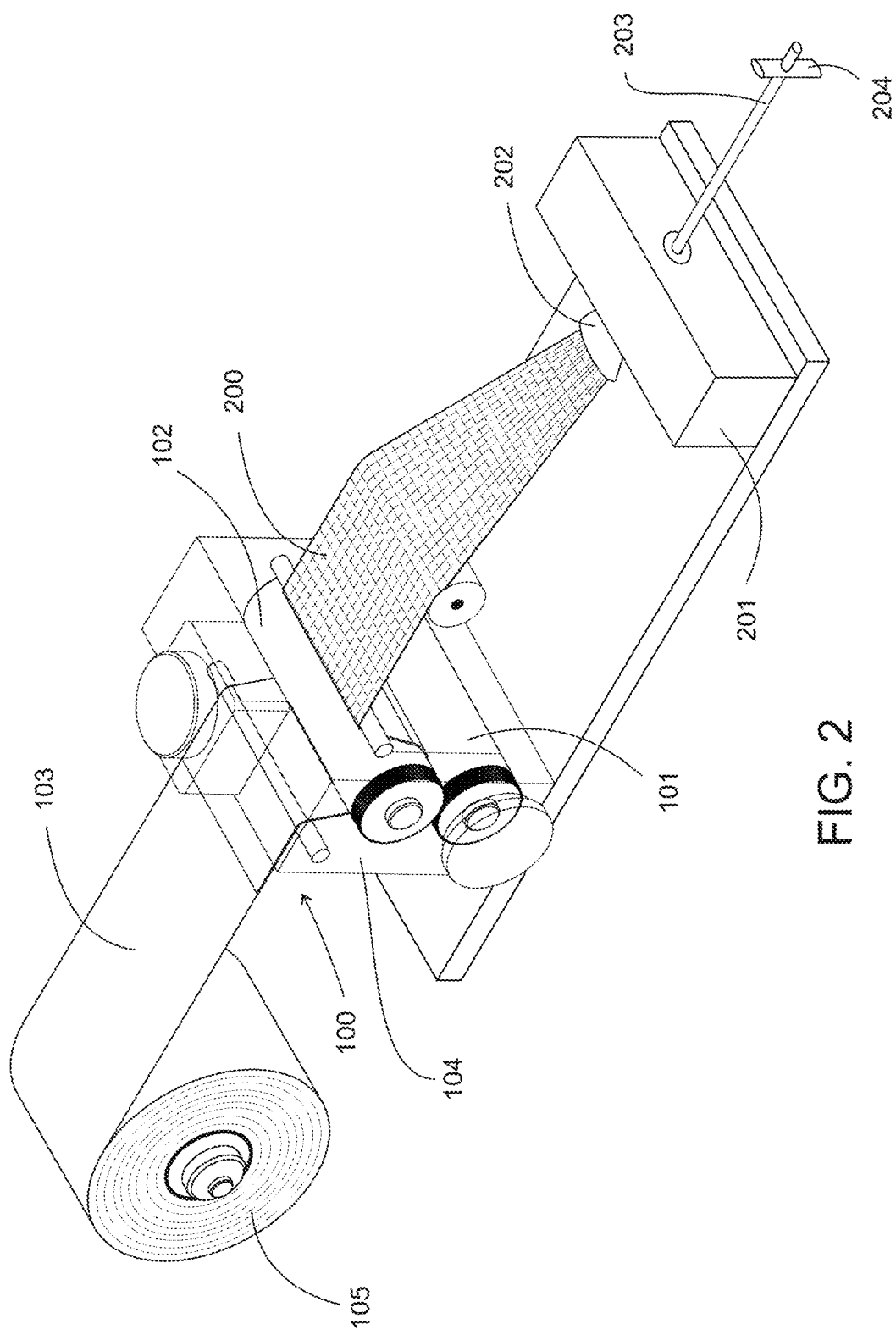
FIG. 2 schematically shows an online production line for manufacturing a cigarette filter according to a preferred embodiment of the invention.

A further preferred embodiment of the method for embossing may be part of an online production process illustrated in FIG. 2, the embossing system 100 then being part of an online production line for manufacturing a cigarette filter (cigarette filter not illustrated). The online production line further comprises for example a compacting device 201 comprising a funnel 202 into which the embossed sheet of substrate 200 is fed, crimped and formed into a filter rod 203 output by the compacting device 201. Hence the embossed sheet of substrate 200 is compacted with the funnel 202. The filter rod 203 may be pulled to a further process step (not illustrated) by means of a pulling jig 204. As previously described in FIG. 1 as being an option, the production line may comprise the bobbin dispensing device 105 configured to carry the bobbin with the stripe of substrate sheet 103 and unwind it out towards the embossing system 100.

Figure 4:
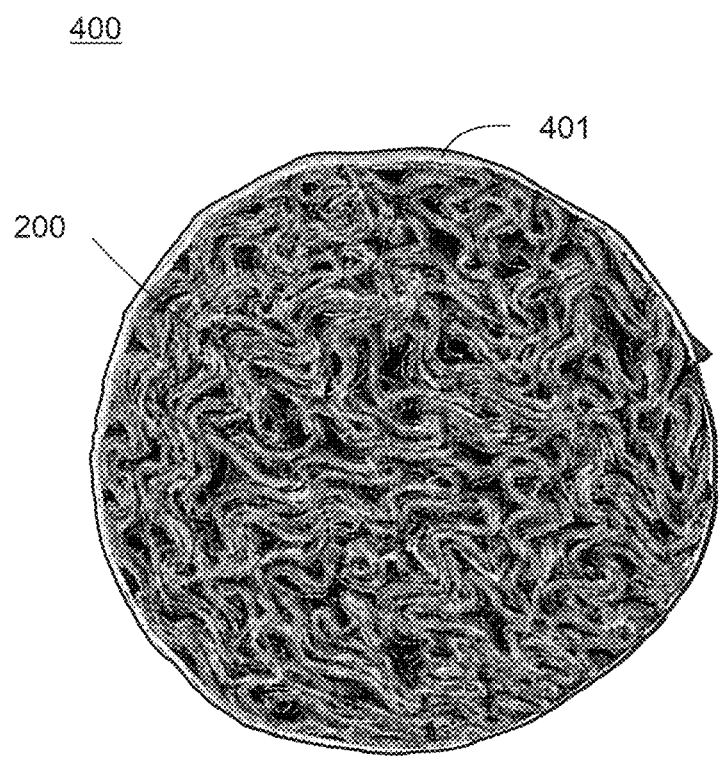
FIG. 4 shows a transversal section through a cigarette filter according to a preferred embodiment of the invention.

Referring to FIG. 4 this shows an example of a transversal section 400 through the filter rod 203 after it has been wrapped in a cylindrical wrapper 401 which is wound around the compacted embossed sheet of substrate 200.

Examples of Embossing

In the following, a description of examples of embossing pattern according to the invention and illustrated in FIGS. 5A to 5D, 6A to 6C, and 7A to 7B is given.

The first structures and the second structures are arranged to form in the embossing pattern any one of polygonal, linear and elliptical shapes.

Preferably, the embossing may be realized according to the patrix-matrix embossing technique. Further details to this known technique are provided in the chapter pertaining to Embossing.

Referring to FIGS. 5A-5D, these each show examples of embossing patterns structured on an embossing tool, configured to be embossed on a sheet of substrate for manufacturing a cigarette filter according to preferred embodiments of the invention. Each of the figures shows a view from above on an embossing pattern, a sectional view along a line A-A represented in the embossing pattern, representing a 2-dimensional topography of the embossing structures along that line, and a sectional schematic view of possible embossed products. It is understood that only one of the two embossing tool's surfaces and sectional views is illustrated in each of FIGS. 5A to 5D, i.e., those to be found on one of the two embossing rollers used to emboss the sheet of substrate. When using patrix-matrix embossing, a corresponding fitting embossing tool's surface needs to be provided on the other one of the two embossing rollers, in a well-known manner which will not be elaborated on here.

Figure 5A:
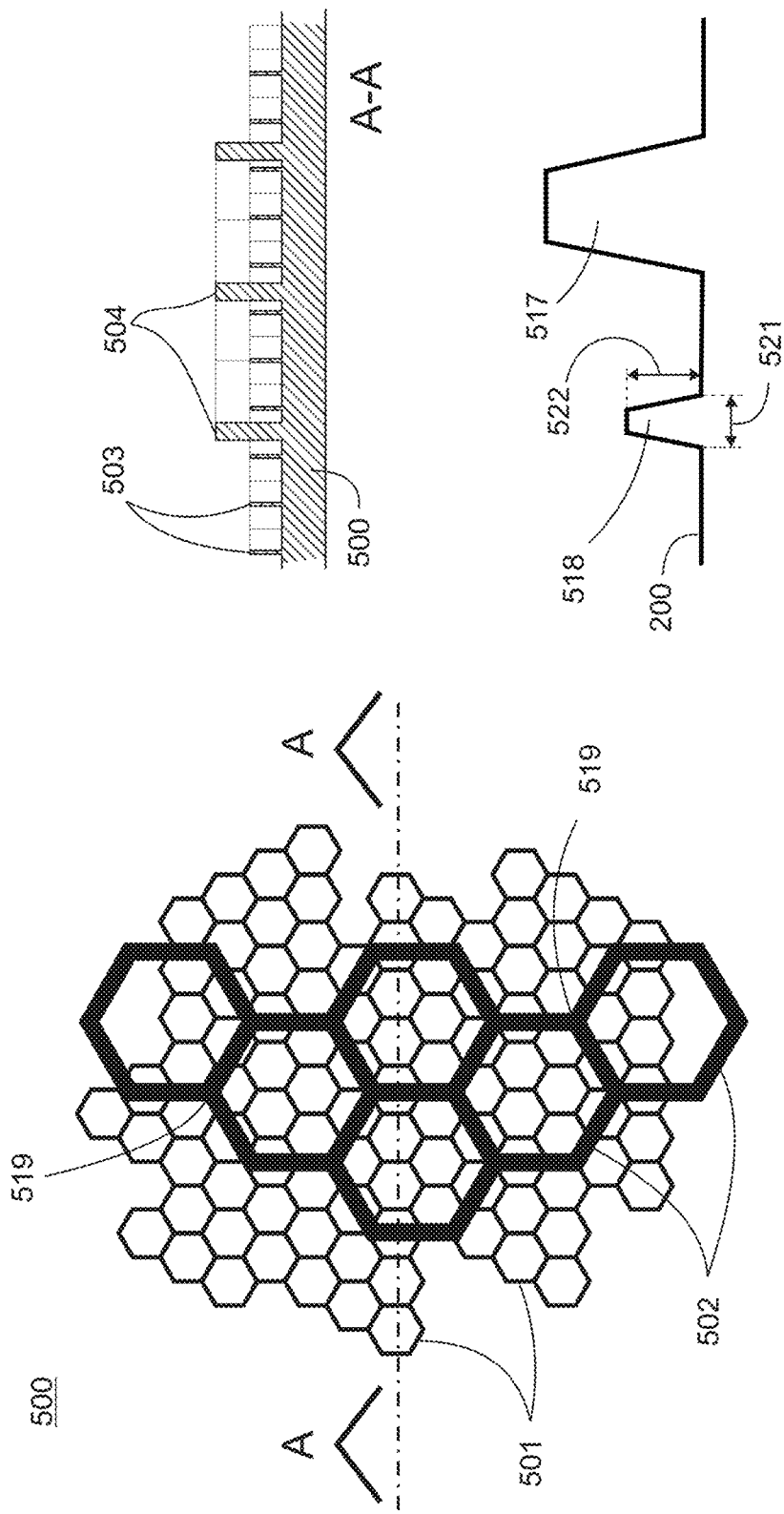
FIGS. 5A-5D show examples of embossing patterns to be embossed on a sheet of substrate for manufacturing a cigarette filter according to preferred embodiments of the invention.

FIG. 5A shows schematically a part of an embossing tool 500 for embossing a sheet of substrate, structured with an embossing pattern that comprises a first honeycomb like pattern, i.e., a series of adjacent first hexagon-shaped cells 501, on which a second honeycomb like pattern with second hexagon-shaped cells 502 larger in size than the first hexagon-shaped cells 501, is superposed. The corresponding sectional view along line A-A shows a sectional views of first embossing wedges 503 of the first hexagon-shaped cells 501, and sectional views of second embossing wedges 504 of the second hexagon-shaped cells 502, the latter being thicker and higher than the former. A sectional schematic view of possible embossed products represents in a non-proportional manner the embossed sheet of substrate 200, with a comparatively small groove 518 produced by one of the first embossing wedges 503 and a comparatively large groove 517 produced by one of the second embossing wedges 504.

Figure 5B:
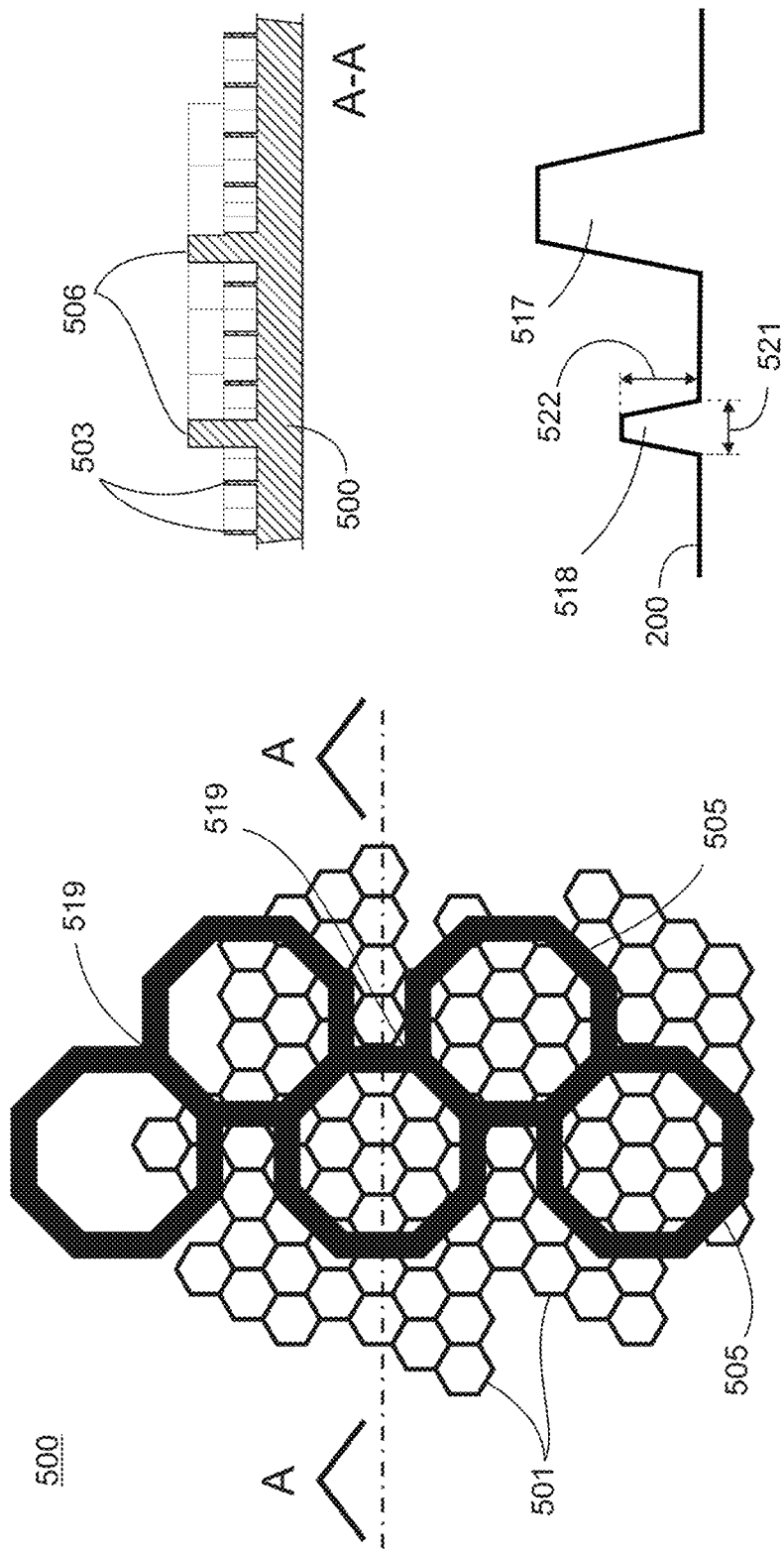

FIG. 5B shows schematically a part of the embossing tool 500 structured with the first honeycomb like pattern, i.e., the series of adjacent first hexagon-shaped cells 501, on which a third pattern with third hexagon-shaped cells 505 larger in size than the first hexagon-shape cells 501, is superposed, whereby each third hexagon-shaped cell 505 has at most 4 of its sides in common with neighboring third hexagon-shaped cells 505. The corresponding sectional view along line A-A shows sectional views of the first embossing wedges 503 of the first hexagon-shaped cells 501, and sectional views of third embossing wedges 506 of the third hexagon-shaped cells 505, the latter being thicker and higher than the former. A sectional schematic view of possible embossed products represents in a non-proportional manner the embossed sheet of substrate 200, with the comparatively small groove 518 produced by one of the first embossing wedges 503 and a comparatively large groove 517 produced by one of the third embossing wedges 506.

Figure 5C:
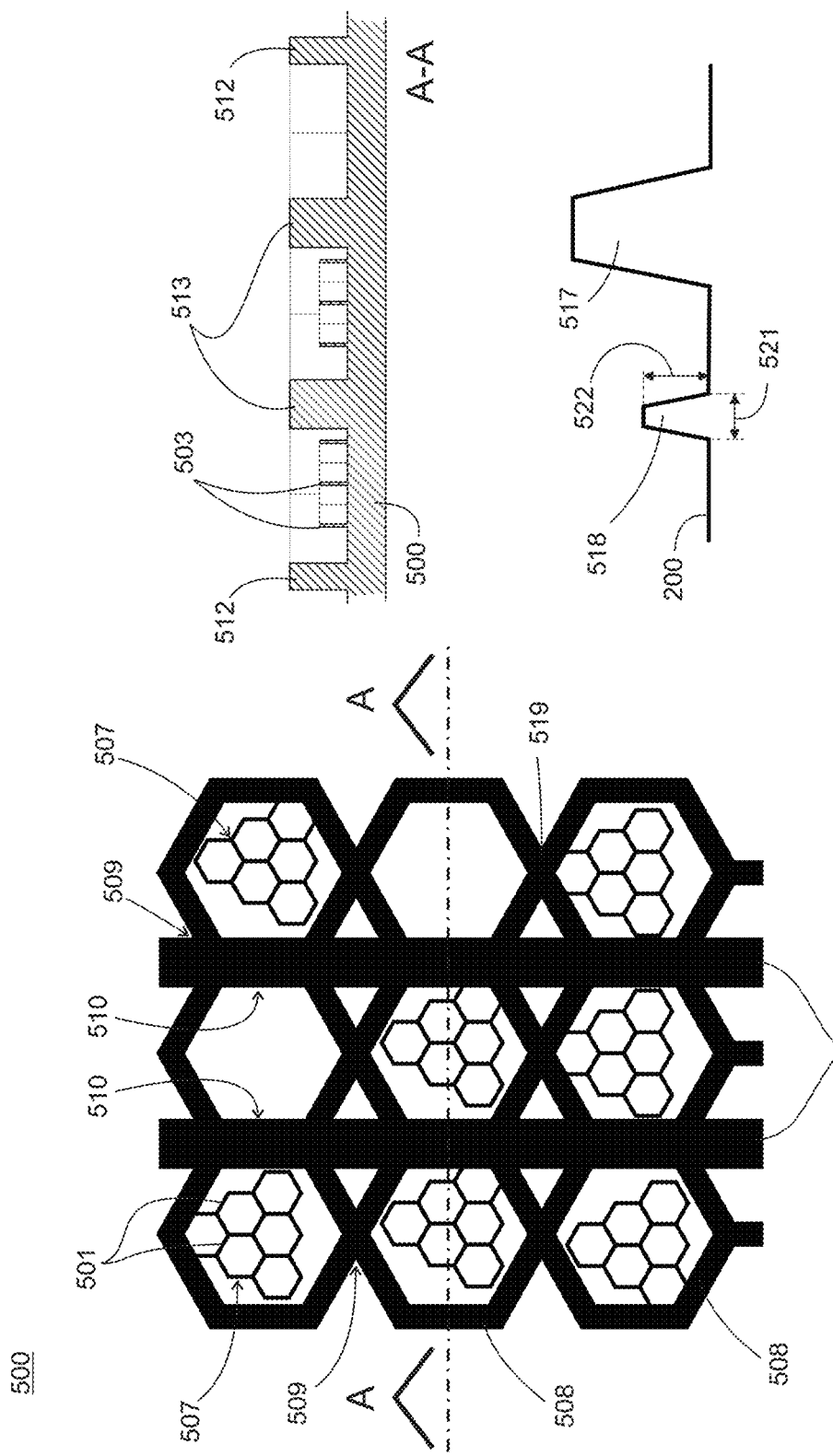

FIG. 5C shows schematically a part of the embossing tool 500 structures with clusters 507 of 6 adjacent first hexagon-shaped cells 501 in a honeycomb-like pattern, and a fourth pattern comprising fourth hexagon-shaped cells 508 connected to each other by their corners 509 and/or by their sides 510 which are included in first longitudinal straight paths 511 having a width greater than a width of the sides 510. The corresponding sectional view along line A-A shows sectional views of the first embossing wedges 503 of the first hexagon-shaped cells 501, and sectional views of fourth embossing wedges 512 of the fourth hexagon-shaped cells 508, the latter being thicker and higher than the former, and sectional views of first embossing wedges 513 of the first longitudinal straight paths 511, which, as already mentioned, are wider than the fourth embossing wedges 512. A sectional schematic view of possible embossed products represents in a non-proportional manner the embossed sheet of substrate 200, with the comparatively small groove 518 produced by one of the first embossing wedges 503 and a comparatively large groove 517 produced by one of the fourth embossing wedges 512.

Figure 5D:
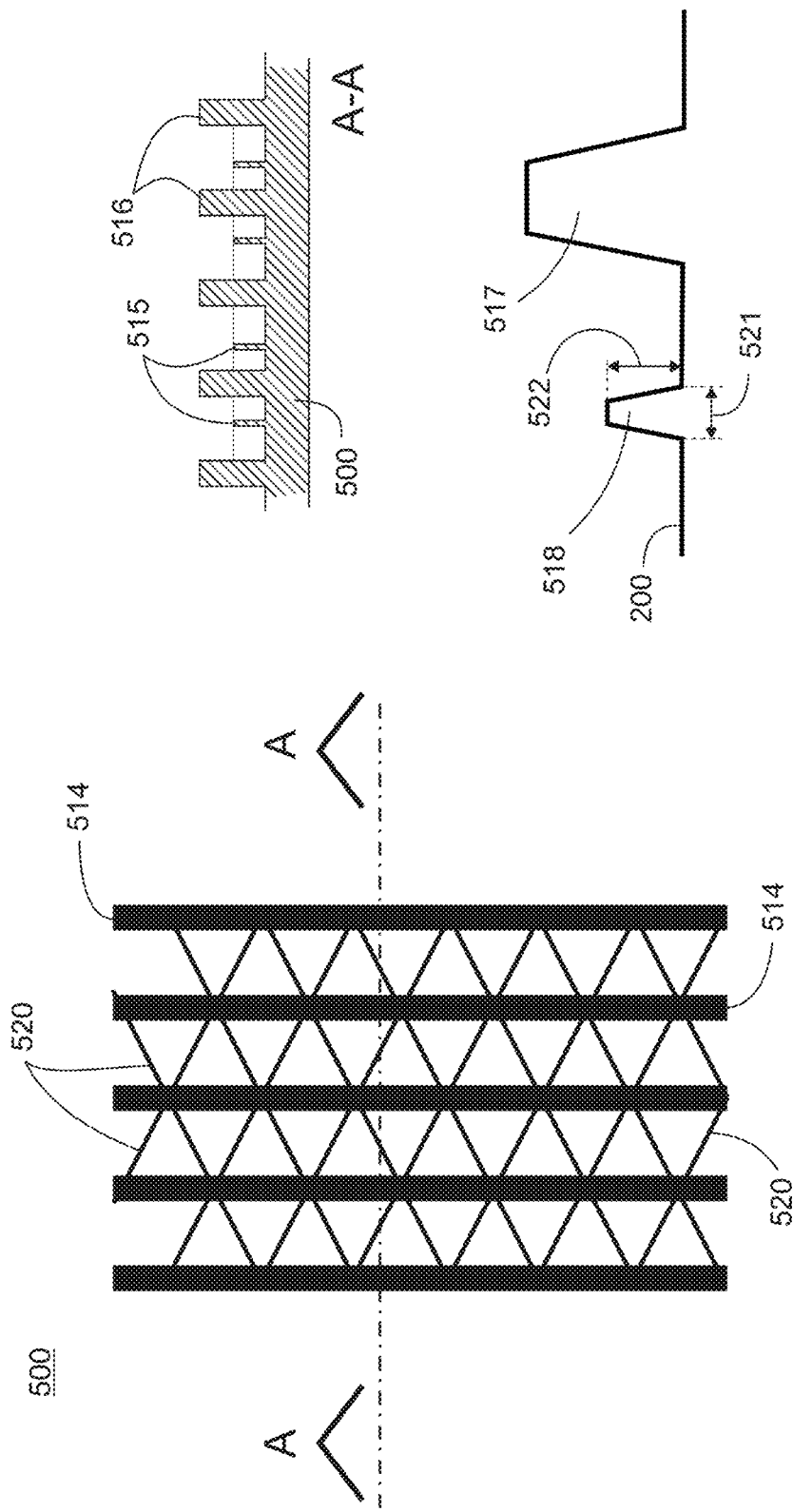

FIG. 5D shows schematically a part of the embossing tool 500 structured with adjacent first triangle-shaped cells 520, some sides of which are included in second longitudinal straight paths 514 having a width greater than a width of sides of the triangle-shaped cells 520. The corresponding sectional view along line A-A shows sectional views of fifth embossing wedges 515 of the triangle-shaped cells 520, and sectional views of second embossing wedges 516 of the second longitudinal straight paths 514, which, as already mentioned, are wider than the fifth embossing wedges 515, and also higher. A sectional schematic view of possible embossed products represents in a non-proportional manner the embossed sheet of substrate 200, with the comparatively small groove 518 produced by one of the fifth embossing wedges 515 and a comparatively large groove 517 produced by one of the second longitudinal straight embossing wedges 516.

In the examples of FIGS. 5A to 5D the first triangle-shaped cells 520 and the first hexagon-shaped cells 501 correspond to the first structures to form crimping lines as introduced in the description of FIG. 1, while the second hexagon-shaped cell 502, the third hexagon-shaped cells 505, the fourth hexagon-shaped cells 508, the first longitudinal straight paths 511, and the second longitudinal straight paths 514 correspond to the second structures to form chimney structures. The description of FIG. 1 also introduced the discussion about chimney structures that cross each other at at least one intersection, whereby the at least one intersection is configured to enhance the random fiber distribution and therewith control an air flow and an air turbulence therein, which produces a natural obstacle to the substances present in the cigarette smoke and to be trapped. Such intersections may be seen throughout FIGS. 5A to 5D referenced by 519 and 509.

FIG. 6A contains a schematic view from above on a sheet of substrate for manufacturing a cigarette filter, having been embossed with first and second structures according to the invention, and hence comprising grooves and ridges. In the present example these form adjacent lozenge shaped cells. First texture 600 is used to represent crimping lines or chimney structures showing as embossed grooves, while second texture 601 is used to represent crimping lines or chimney structures showing as embossed ridges and third texture 602 is used to represent unaffected surface (non-embossed) of the sheet of substrate. A similar approach is taken in FIGS. 6B to 6C to represent embossed grooves and ridges that form various patterns made of straight lines, some of which comprise lozenges, other ones of which comprise triangles.

Taking the example view of FIG. 6A the thinner lines 603 with the first texture 600 represent crimping lines, while thicker lines 604 with the second texture 601 represent chimney structures. Surfaces 605 with the third texture 602 are unaffected parts of the sheet of substrate. FIG. 6A further illustrates an individual lozenge 606 with an indication of size of 4 mm that the lozenges have in the schematic view.

Taking the example view of FIG. 6B, the thinner lines 603 with the first texture 600 represent crimping lines, while thicker lines 604 with the second texture 601 represent chimney structures. Surfaces 605 with the third texture 602 are unaffected parts of the sheet of substrate. FIG. 6B further illustrates an individual lozenge 607 with an indication of size of 3 mm that the lozenge has in the schematic view.

Taking the example view of FIG. 6C, the thinner lines 603 with the first texture 600 represent crimping lines, while thicker lines 604 with the second texture 601 represent chimney structures. Surfaces 605 with the third texture 602 are unaffected parts of the sheet of substrate. FIG. 6C further illustrates an individual pair of triangles 608 with an indication of size of 2.2 mm that the triangles have in the schematic view.

FIGS. 7A and 7B are schematic views from above on a sheet of substrate 500 for manufacturing a cigarette filter, in which straight stiffening grooves 700 and 701 are embossed corresponding to laterally oriented stiffening grooves. Each view also has a corresponding sectional view along line A-A, which corresponds to a longitudinal direction of the sheet of substrate, wherein depths of the stiffening grooves 700 and 701 in the thickness of the sheet of substrate 500 are represented. In the views from above, fourth texture of the stiffening grooves 700 and fifth texture of stiffening grooves 701 are representative of the depth of the corresponding stiffening grooves, as illustrated in the sectional views, while sixth texture 702 is representative of surfaces that may be structured by embossing with crimping lines and chimney structures, for example with any one of the examples illustrated in FIGS. 6A-6C. The stiffening grooves 700 and 701 have a width at a surface level of the unaffected surface of the sheet of substrate, surface of crimping lines or surface of chimney structures traversed by the stiffening grooves 700 and 701, in a sixth range of 1.0 mm to 9.0 mm, and a third height or depth measured from the surface of the crimping lines, chimney structures and unaffected surface of the sheet of substrate, in a seventh range of 0.01 mm to 0.5 mm.

FIGS. 8A to 8G are photographs showing front and back sides of embossed sheets of substrate according to examples of the invention.

FIG. 8A in the upper part (Recto) shows ridges forming a honeycomb-like pattern made of hexagon-shaped cells, the ridges corresponding to crimping lines, and grooves having a width larger than that of the ridges that form chimney structures that extend from one side of the photograph to the opposite side. In the lower part (Verso) the other side of the upper part is photographed, hence the crimping lines now appear as grooves, and the chimney structures as ridges.

FIG. 8B in the upper part (Recto) shows grooves forming a honeycomb-like pattern made of hexagon-shaped cells, the grooves corresponding to crimping lines, and further grooves having a width larger than that of the ridges that form chimney structures that extend from one side of the photograph to the opposite side. In the lower part (Verso) the other side of the upper part is photographed, hence the crimping lines now appear as ridges, and the chimney structures also as ridges. This is an embossed product that has a pattern similar to that which could be obtained when embossing with the embossing pattern from FIG. 5A.

FIG. 8C in the upper part (Recto) shows grooves forming a honeycomb-like pattern made of hexagon-shaped cells, the grooves corresponding to crimping lines, and further grooves having a width larger than that of the crimping lines grooves, that form chimney structures that extend from one side of the photograph to the opposite side. In the lower part (Verso) the other side of the upper part is photographed, hence the crimping lines now appear as ridges, and the chimney structures also as ridges.

FIG. 8D in the upper part (Recto) shows grooves forming patterns made of adjacent triangle-shaped cells, the grooves corresponding to crimping lines, and ridges having a width larger than that of the grooves, that form chimney structures that extend from one side of the photograph to the opposite side. In the lower part (Verso) the other side of the upper part is photographed, hence the crimping lines now appear as ridges, and the chimney structures as grooves.

FIG. 8E in the upper part (Recto) shows grooves forming patterns made of adjacent lozenge-shaped cells, the grooves corresponding to crimping lines, and further grooves having a width larger than that of the crimping grooves, that form chimney structures that extend from one side of the photograph to the opposite side. In the lower part (Verso) the other side of the upper part is photographed, hence the crimping lines now appear as ridges, and the chimney structures also as ridges.

FIG. 8F in the upper part (Recto) shows grooves forming patterns made of adjacent lozenge-shaped cells, the grooves corresponding to crimping lines, and further grooves having a width larger than that of the crimping grooves, that form chimney structures that extend from one side of the photograph to the opposite side. In the lower part (Verso) the other side of the upper part is photographed, hence the crimping lines now appear as ridges, and the chimney structures also as ridges.

FIG. 8G in the upper part (Recto) shows grooves forming patterns made of adjacent triangle-shaped cells, the grooves corresponding to crimping lines, and further grooves having a width larger than that of the crimping grooves, that form chimney structures that extend from one side of the photograph to the opposite side. In the lower part (Verso) the other side of the upper part is photographed, hence the crimping lines now appear as ridges, and the chimney structures also as ridges. This is an embossed product that has a pattern similar to that which could be obtained when embossing with the embossing pattern from FIG. 5D.

Embossing

Examples of embossing rollers that may be used in the method for embossing according to the invention may be obtained in a known manner, for example as disclosed in the US publication to Boegli U.S. Pat. No. 9,579,924 B2. This discloses a method for manufacturing a set of embossing rollers for a device for embossing packaging materials that has two rollers, as well as a set of embossing rollers manufactured according to the aforementioned method, as well as to the use of these embossing rollers in a device for embossing packaging materials. More specifically, this publication describes an embossing roller set comprising a male roller including structural elements and an associated female roller including structural elements, wherein the male roller and the female roller are manufactured as follows:

the male roller has a male surface structure including structural elements and/or logo structures and the female roller has a female surface structure that is associated to the surface structure of the male roller for the common embossing operation with the male roller, the set of embossing rollers designed for fine embossing;

the male roller having the male surface structure is produced;

the associated female roller is produced independently of the male roller, the female roller having the female surface structure including structural elements and/or logo structures, the steps of producing the male roller and the female roller include the steps of manufacturing contours of the male surface structure and the female surface structure with an overall linear error of less than +/−10 μm and an angular error of less than 4°, such that dimensions of the structural elements of the male roller and dimensions of the structural elements of the female roller deviate from one another by a pre-determined amount without impairing a cooperation between the male roller and the female roller, and manufacturing at least one of voluntary deviations of linear dimensions of the structural elements of the male roller and the structural elements of the female roller to be greater than 15 μm, and voluntary deviations of angular dimensions of angles of edges of the structural elements of the male roller and angles of edges of the structural elements of the female roller to be more than 4°.

Accordingly, the structural elements of the male roller and the structural elements on the associated female roller are not inversely congruent, deviate by a defined amount of more than 15 μm linearly and 4° angularly, and contours of the structural elements of the male roller and contours of the structural elements of the female roller exhibit an overall linear error of less than +/−10 μm and an angular error of less than 4°.

The type of embossing achieved is also known as "patrix-matrix" embossing.

Figure 9A:
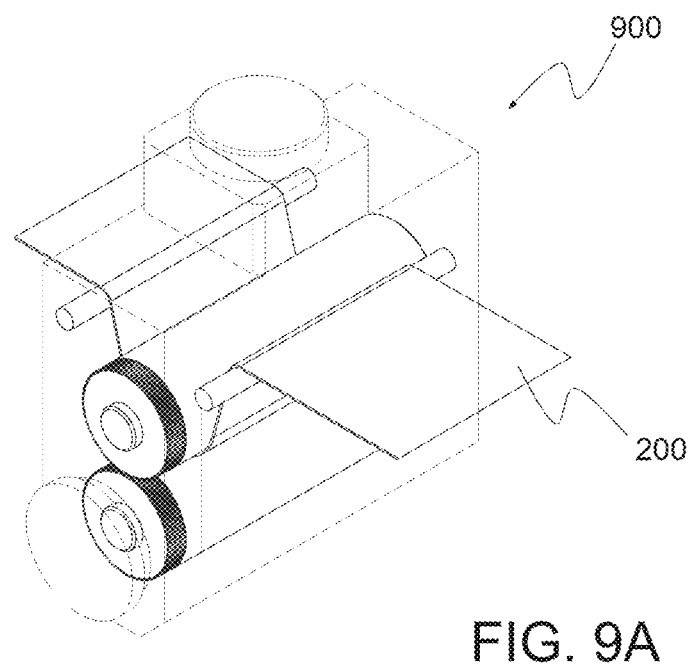
FIGS. 9A and 9B illustrate an example embodiment for a quick-exchange device for embossing rollers.

The embossing rollers may be housed in a quick-change device 900 as illustrated in FIG. 9A. Such quick-change device 900 has been used in a majority of all cigarette paper embossing devices worldwide ever since. In such a device, the axle of the counter-roller is movable in all three coordinate directions in order to allow a self-synchronization of the embossing rollers.

Figure 9B:
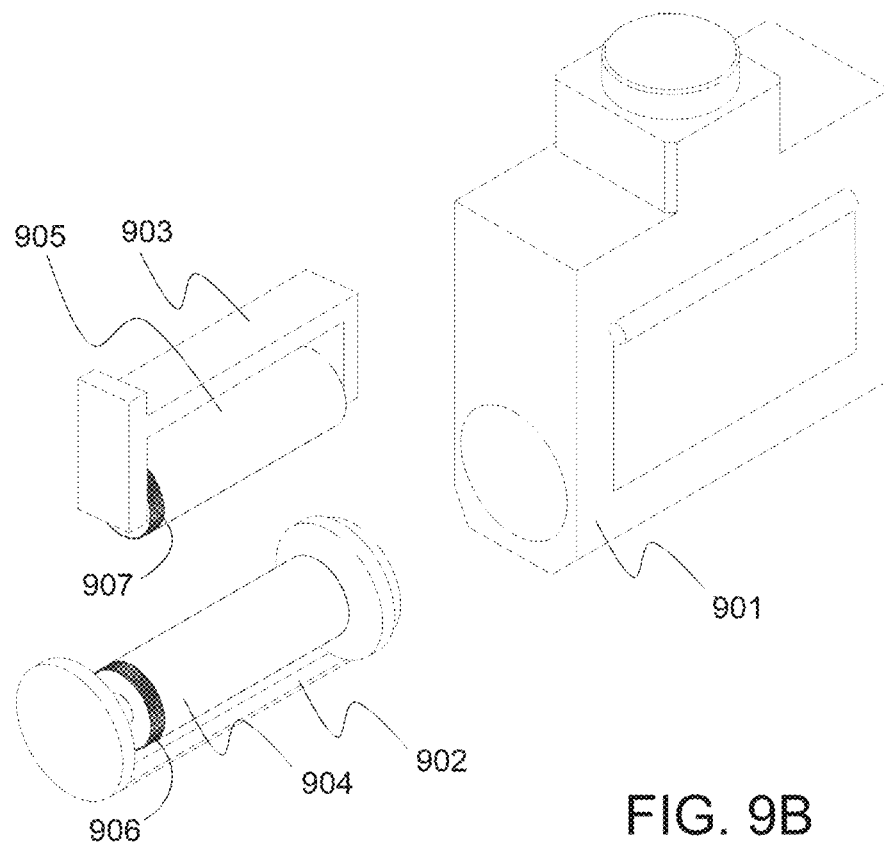

Referring to FIG. 9B the quick-change device comprises a housing 901 having two seats intended to receive respective roller supports 902 and 903. Roller support 902 serves for mounting the male roller 904 that is driven by a non-represented drive, and roller support 903 serves for mounting the female roller 905.

In the present example, the female roller 905 is driven by the driven male roller 904 via gearwheels 906 and 907 located at one end of the rollers. In order to ensure the required high precision of the synchronization, the gearwheels are very fine. However, other synchronizing means, e.g. electric motors, may also be used.

Example(s) of Substrate(s)

As already described in the section herein above pertaining to "background", a number of biodegradable substrates for use in cigarette filter are known.

For example, the website swissqualitypaper.com is dedicated to offering paper for manufacturing a cigarette filter which is 100% biodegradable thanks to natural, ecological raw materials and production processes. Further the website McAirlaid's.net presents a filter material that consists of 100% cellulose, which is a sustainable raw material. The filter so obtained is fully compostable.

Further examples of substrate to be used are known from US publication U.S. Pat. No. 10,076,135 B2. Some of these examples and additional details are given in the present chapter.

U.S. Pat. No. 10,076,135 B2 describes a non-synthetic natural cigarette filter tow which constitutes a filter material. In this context the term tow designates the rough, untwisted filament of fibers from a determined material. The filter material includes a number of natural ingredients including a biodegradable and compostable combination of natural fibers of various types bound together with a natural binder solution or dispersion, or hydroentangled. An intimate blend of two or more natural fibers is used to form a nonwoven sheet for manufacturing the cigarette filter element. A natural binder (adhesive) or binder derived from a natural source is applied to the nonwoven sheet. The binder may be applied such that it coats all of the constituent fiber surfaces, or may be applied in specific locations of the sheet. The optimum fiber morphology, fiber composition, binder content and nonwoven sheet parameters such as areal density, volume density, air permeability and mechanical properties can be altered to obtain different performance of a cigarette filter with respect to smoking parameters, such as pressure drop and retention properties. These depend on the particular product requirements.

In a preferred embodiment, the biodegradable filter sheet material/substrate may comprise a mixture with:

20-60% by weight of abaca or sisal pulp or fiber or wood pulp, or 20-60% by weight of combinations of two or more of wood pulp, abaca pulp or fiber, and sisal pulp or fiber;

5-25% by weight of hemp or flax short cut fibers or filler;

10-35% by weight of cotton flock;

5-40% by weight of regenerated cellulose fiber

The mixture also includes a natural binder or a binder manufactured from natural renewable sources.

The binder may be derived from biopolymers or bio-based polymers, such as starch, a water soluble biodegradable polymer material such as carboxymethyl cellulose. The binder is water soluble to create a solution, or water dispersible to create binder dispersion/emulsion in water.

Binder solution/dispersion/emulsion viscosity is adjusted to comply with the application process. Solid binder content applied on the fibrous web varies in range 2%-30% of dry weight. In another embodiment, no binder is used, and the filter is manufactured using a wetlaid and hydroentanglement process.

In one embodiment, the natural binder is selected from the group consisting of natural latex, vegetable gums, biopolymer or bio-based binders, such as starch-based binders, cationic starch binder and binders made from renewable sources such as Carboxymethyl cellulose (CMC).

In one embodiment, an intimate blend of two or more natural fibers is used to form a nonwoven sheet of substrate for manufacturing of a cigarette filter element. The fiber blend also contains fiber from a regenerated natural polymer, preferably cellulose. A natural binder (adhesive) or binder derived from a natural source is applied to the nonwoven sheet. The binder may be applied such that it coats all of the constituent fiber surfaces, or may be applied in specific locations on the sheet. The optimum fiber morphology, fiber composition, binder content and nonwoven sheet parameters such as areal density, volume density, air permeability and mechanical properties can be altered to obtain different performance of a cigarette filter with respect to smoking parameters, such as pressure drop and retention properties. These depend on the particular product requirements. The binder provides nonwoven material with the strength for converting process. The water-soluble binder allows for disintegration in dry state, and promotes quick dispersibility in high moisture (humidity) and wet state.

According to a further preferred embodiment, a nonwoven sheet of substrate for use in manufacture of a biodegradable cigarette filter comprises a mixture of:
- 0-50% by weight of hemp fiber, hemp short cut fiber, or hemp filler,
- 0-50% by weight of flax fiber, flax short cut fiber, or flax filler,
- 0-95% by weight of abaca fiber or abaca pulp;
- 0-95% by weight of sisal fibers or sisal pulp;
- 0-50% by weight of wood pulp;
- 0-50% by weight of cotton fibers or cotton flock;
- 0-50% by weight of regenerated cellulose fibers; and
- 0-30% by weight of a natural binder or a binder manufactured from natural renewable sources.

Preferably fibers in the sheet of substrate have a mean length smaller or equal to 3.5 mm. In further preferred embodiments the mean length of the fibers may be either smaller or equal to 1.5 mm, or even equal or smaller than 1 mm.

Preferably fibers may a diameter that is smaller or equal than 500 µm. In further preferred embodiments, the diameter is equal or smaller than 100 µm, or even equal or smaller than 50 µm.

Favorable embodiments for the sheet of substrate involve following combinations:
- cut length of 4 mm, diameter in the range of 10-500 µm;
- cut length of 6 mm, diameter in the range of 10-50 µm;
- cut length of approximately 1.5 mm, diameter in the range of 10-20 µm, As an effect of manufacturing a cigarette filter with a sheet of substrate embossed according to the present invention, such a cigarette filter may achieve a pressure drop in a range from 10 mmWg to 500 mmWg.

Air-flow through such a cigarette filter is subject to the international CORESTA standard and must be adjusted to 17.5 ml/sec. This is characteristic of pressure drop and air permeability.

As previously mentioned herein above, the sheet of substrate's air permeability is configured with filtration capabilities of substances present in a cigarette smoke. Such substances are for example particles from the following list:
TAR (Total Aerosol Residue)
TPM (Total Particulate Matter)
Nicotine
Benzo(a)pyrene
Formaldehyde
Acetaldehyde
Acetone
Acrolein
Propionaldehyde
Crotonaldehyde
MEK
Butyraldehyde
Hydroquinone
Resorcinol
Catechol
Phenol
M+p Cresol
O-Cresol
Ammonia
Cyanide (HCN)
Pyridine
Quinoline
1,3 butadiene
Isoprene
Acrylonitrile
Benzene
Toluene
Styrene
N Nitrosamine
N Nitrosoanatabine NAT
N Nitrosoanabasine NAB
4-(Methylnitrosamino)

Pre-Conditioning

In a preferred embodiment, the sheet of substrate may be subjected to pre-embossing steam (water atomization) in order to prepare the substrate's fibers to better absorb the deformation energy transferred through the embossing process. It can be considered a type of pre-conditioning to avoid fiber deterioration (dust) but more importantly, to bring the fiber into an ideal flexible cell structure that will allow the process to shape the substrate with the customized innovative channels and designed deformations necessary to optimize the filtration properties.

Advantages of the Invention

The following is a non-exhaustive list of advantages that may be attributed to the invention.
- Improve substrate runnability during the filter rod manufacturing process. The pre-breakdown of the fiber's cell structure by the embossed crimping lines enhances substrate flexibility and adjustability from material feeding to rod formation until final filter rod manufacturing.
- Allows a creation of unique substrate identification, with any one of a logo, a QR-code forming structure, or a hidden information, preventing counterfeit and illegal copy of unauthorized manufacturers. Clients would have the assurance that they are acquiring genuine and original material.
- The preferred embodiments as described herein enhance biodegradability and dispersibility of the cigarette filter and/or substrate sheet, as fibers of the substrate sheet are pre-deformed and pre-broken thereby facilitating the cellular breakdown and working as a biodegradation catalyst.

The preferred embodiments as described herein are also designed to reduce the amount of substrate needed to manufacture a cigarette filter as compared to non-embossed substrate without compromising the filtration characteristics. By increasing the air filtration capability, the invention can be utilized to optimize material usage, impacting cost reduction and lower environmental impact.

The embossing pattern of the embossed plurality of stiffening grooves according to the preferred embodiments as described herein creates the ability to enhance filter stiffness without the need for chemicals, binders or plasticizers.

The above-described preferred embodiments allow a unique way to use a substrate that replaces the cellulose acetate (CA) utilized in prior art manufacturing of cigarette filters, by improving its machine runnability and its filtering properties.

The embossed substrate of the preferred embodiments, bearing crimping lines, chimney structures and stiffening grooves, creates a unique solution that may eradicate the most littered single-use plastic in the world.

The combination of the substrate with the embossing technology according to the preferred embodiments enables the substrate to effectively and efficiently filter cigarette smoke particulate and vapor phases, hence delivering to smokers, similar exposure to toxicants when compared to CA while maintaining the sensorial attributes of the desired product flavor and taste notes.

The invention claimed is:

1. A method for embossing a sheet of substrate using at least a first embossing roller and a second embossing roller configured to respectively emboss first structures and second structures, thereby embossing the sheet of substrate when the sheet of substrate passes in a nip formed by the first and second embossing rollers, the embossed sheet of substrate being configured to be used in a manufacturing of cigarette filters and configured to be entirely biodegradable, the method comprising:
providing the sheet of substrate comprising fibers with a cut length in a range of 0.5 mm to 6.0 mm, and with a diameter in a range of 10 ppm to 500 µm, the fibers being entirely biodegradable and randomly distributed to deliver an air permeability, the air permeability of the sheet of substrate being configured with filtration capabilities of substances present in cigarette smoke; and
embossing the sheet of substrate with the first structures using the first embossing roller and the second structures using the second embossing roller to respectively form the crimping lines and the chimney structures, the crimping lines having a first width at a surface level of the sheet of substrate and a first height or depth measured from the surface level in a first range of 0.1 mm to 0.5 mm, thereby being configured to be deformable when used in the manufacturing process of cigarette filters, the chimney structures comprising segments having a second width at the surface level of the sheet of substrate, in a second range of 0.5 mm to 5.0 mm, and a second height or depth measured from the surface level in a third range of 0.1 mm to 1.5 mm, thereby being configured to remain open when used in the manufacturing process of cigarette filters and influence a pressure drop of air in the cigarette filters.

2. The method of claim 1, wherein when the second structure are embossed, the second structures are embossed in form of a plurality of chimney structures that cross each other at at least one intersection configured to enhance random fiber distribution and therewith control an air flow and air turbulence therein, which produces a natural obstacle to the substances present in the cigarette smoke and to be trapped.

3. The method according to claim 1, wherein the embossing further comprises embossing the sheet of substrate with third structures to form at least a stiffening groove configured to be transversal relative to an intended longitudinal shape of a cigarette filter to be manufactured with the embossed sheet of substrate, and confer a degree of stiffness to the cigarette filter, the at least one stiffening groove having a third width at a surface level of the unaffected surface of the sheet of substrate, the surface of the crimping lines or the surface of the chimney structures traversed by the at least one stiffening groove, in a range of 1.0 mm to 9.0 mm, and a third height or depth measured from the surface of the crimping lines, the surface of the chimney structures and the unaffected surface of the sheet of substrate, in a range of 0.01 mm to 0.5 mm.

4. The method according to claim 3, wherein the embossing of the first structures, the embossing of the second structures and the embossing of the third structures are configured to produce an uninterrupted and repeating pattern of the crimping lines and the chimney structures in a wall-paper fashion.

5. The method according to claim 1, wherein the method is realized in an off-line process.

6. The method according to claim 1, further comprising:
processing the embossed sheet of substrate which is part of an online process configured for the manufacturing of cigarette filters.

7. The method according to claim 6, wherein the processing is one of:
(i) compacting the embossed sheet of substrate with a funnel and forming the embossed sheet of substrate into a filter rod,
(ii) wrapping the filter rod with a cylindrical wrapper, and
(iii) dispensing a stripe of substrate sheet from a bobbin dispensing device configured to carry a bobbin and unroll the bobbin for the embossing.

8. The method according to claim 1, wherein the embossing of the first structures and the embossing of the second structures are configured to produce an uninterrupted and repeating pattern of the crimping lines and the chimney structures in a wall-paper fashion.

9. The method according to claim 1, wherein the first structures and the second structures are arranged to form one of polygonal shapes, linear shapes, and elliptical shapes in an embossing pattern.

10. The method according to claim 1, wherein the sheet of substrate is embossed with one of a logo, a QR-code forming structure, and a hidden information, the hidden information being configured to be readable by an image reading device that interprets the hidden information by a decoder.

11. The method according to claim 1, wherein the embossing is realized in a patrix-matrix configuration.

12. The method according to claim 1, wherein the sheet of substrate comprises a mixture of:
20-60% by weight of abaca or sisal pulp or fiber or wood pulp, or 20-60% by weight of combinations of two or more of wood pulp, abaca pulp or fiber, and sisal pulp or fiber,
5-25% by weight of hemp or flax short cut fibers or filler, 10-35% by weight of cotton flock, and 5-40% by weight of regenerated cellulose fiber.

13. The method according to claim 12, wherein the mixture includes a natural binder or a binder manufactured from natural renewable sources.

14. The method according to claim 1, wherein the sheet of substrate comprises a mixture of:
- 0-50% by weight of one of hemp fiber, hemp short cut fiber, and hemp filler,
- 0-50% by weight of one of flax fiber, flax short cut fiber, and flax filler,
- 0-95% by weight of one of abaca fiber and abaca pulp,
- 0-95% by weight of one of sisal fibers and sisal pulp,
- 0-50% by weight of one of wood pulp,
- 0-50% by weight of one of cotton fibers and cotton flock,
- 0-50% by weight of regenerated cellulose fibers, and
- 0-30% by weight of one of a natural binder and a binder manufactured from natural renewable sources.

* * * * *